(12) United States Patent
Zhao et al.

(10) Patent No.: US 12,108,031 B2
(45) Date of Patent: Oct. 1, 2024

(54) HARMONIZED DESIGN AMONG MULTIPLE REFERENCE LINE INTRA PREDICTION, TRANSFORM PARTITIONING AND TRANSFORM KERNELS

(71) Applicant: TENCENT AMERICA LLC, Palo Alto, CA (US)

(72) Inventors: Liang Zhao, Sunnyvale, CA (US); Xin Zhao, San Jose, CA (US); Madhu Peringassery Krishnan, Mountain View, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 207 days.

(21) Appl. No.: 17/571,284

(22) Filed: Jan. 7, 2022

(65) Prior Publication Data

US 2022/0345690 A1    Oct. 27, 2022

Related U.S. Application Data

(60) Provisional application No. 63/176,049, filed on Apr. 16, 2021.

(51) Int. Cl.
*H04N 19/00*      (2014.01)
*H04N 19/105*     (2014.01)
(Continued)

(52) U.S. Cl.
CPC .......... *H04N 19/105* (2014.11); *H04N 19/12* (2014.11); *H04N 19/159* (2014.11); *H04N 19/176* (2014.11)

(58) Field of Classification Search
CPC ...................................... H04N 19/00
See application file for complete search history.

(56) References Cited

U.S. PATENT DOCUMENTS

2014/0341281 A1   11/2014   Bossen et al.
2019/0141318 A1    5/2019   Li et al.
(Continued)

FOREIGN PATENT DOCUMENTS

CN   115516856 A    12/2022
JP   2021518078 A    7/2021
(Continued)

OTHER PUBLICATIONS

Alexy Filippov et al., "Recent Advances in Intra Prediction for the Emerging H.266/VVC Video Coding Standard", IEEE, 2019 International Multi-Conference on Engineering, Computer and Information Sciences (SIBIRCON), DOI: 10.1109/SIBIRCON48586.2019.8958416, Oct. 2019, 6 pgs.

(Continued)

*Primary Examiner* — Maryam A Nasri
(74) *Attorney, Agent, or Firm* — Morgan, Lewis & Bockius LLP

(57) ABSTRACT

This disclosure relates to a harmonized design among multiple reference line intra prediction, transform partitioning, and transform kernels or processing video information. One example method is disclosed. The method includes retrieving a data block of a video frame, the data block having an adjacent reference line and one or more non-adjacent reference lines in the video frame; determining whether one of the one or more non-adjacent reference lines is to be used for intra prediction of the data block. When an adjacent reference line is used for the intra prediction of the data block, selecting a target transform kernel from a first set of transform kernels to transform the data block; and when a non-adjacent reference line is used for the intra prediction of the data block, selecting the target transform kernel from a second set of transform kernels to transform the data block.

18 Claims, 27 Drawing Sheets

(51) Int. Cl.
    *H04N 19/12*     (2014.01)
    *H04N 19/159*     (2014.01)
    *H04N 19/176*     (2014.01)

(56) References Cited

U.S. PATENT DOCUMENTS

| | | |
|---|---|---|
| 2019/0306498 A1 | 10/2019 | Zhao et al. |
| 2020/0374531 A1 | 11/2020 | Zhao et al. |
| 2020/0389671 A1 | 12/2020 | Zhao et al. |
| 2021/0185312 A1* | 6/2021 | Lu ................. H04N 19/122 |
| 2022/0046281 A1* | 2/2022 | Nam ................. H04N 19/70 |

FOREIGN PATENT DOCUMENTS

| | | |
|---|---|---|
| WO | WO 2019194950 A2 | 10/2019 |
| WO | WO 2022211877 A1 | 10/2022 |

OTHER PUBLICATIONS

Jianle Chen et al., "Algorithm Description for Versatile Video Coding and Test Model 12 (VTM 12)", Document: JVET-U2002-v1, Joint Video Experts Team (JVET) of ITU-T SG 16 WP 3 and ISO/IEC JTC 1/SC 29/WG 11, 21st Meeting: by teleconference, Jan. 6-15, 2021, 101 pgs.

Tencent Technology, Extended European Search Report and Supplementary Search Report, EP Patent Application No. 22764289.9, Feb. 22, 2024, 14 pgs.

Tencent Technology, ISRWO, PCT/US2022/014277, Jun. 10, 2022, 11 pgs.

Tencent Technology, IPRP, PCT/US2022/014277, Oct. 12, 2023, 8 pgs.

Tencent Technology, Japanese Office Action, JP Patent Application No. 2022561078, Nov. 14, 2023, 23 pgs.

Tencent Technology, Vietnamese Office Action, VN Patent Application No. 1202207247, Nov. 17, 2023, 3 pgs.

Voluntary Disclosure, "Harmonized Design Among Multiple Reference Line Intra Prediction, Transform Partitioning and Transform Kernels", 14 pgs.

Jin Heo et al., "Non-CE3: Simplification on Transform Selection for Multiple Reference Line (MRL)", Document: JVET-O0353, Joint Video Experts Team (JVET) of ITU-T SG 16 WP 3 and ISO/IEC JTC 1/SC 29/WG 11, 15$^{th}$ Meeting: Gothenburg, SE, Jul. 3-12, 2019, 3 pgs.

Liang Zhao et al., "Non-CE3/6: Transform Selection for MRL", Document: JVET-O0546, Joint Video Experts Team (JVET) of ITU-T SG 16 WP 3 and ISO/IEC JTC 1/SC 29/WG 11, 15th Meeting: Gothenburg, SE, Jul. 3-12, 2019, 5 pgs.

\* cited by examiner

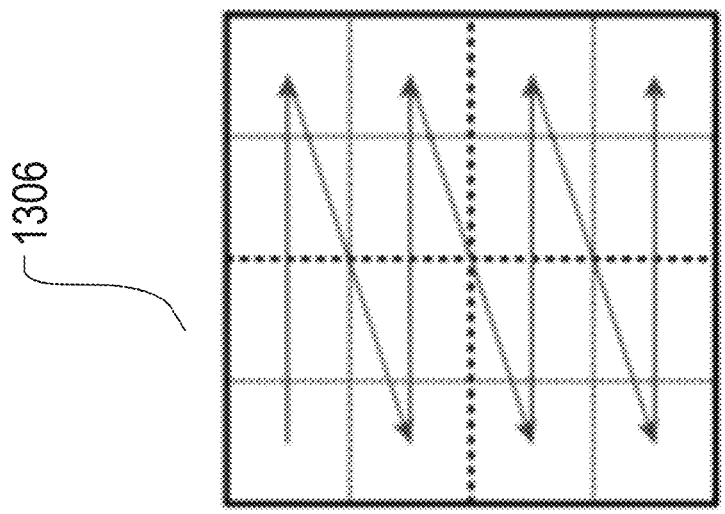
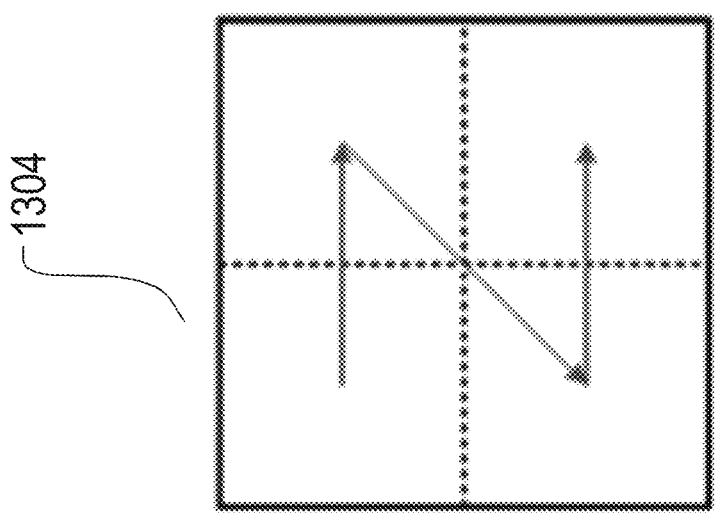
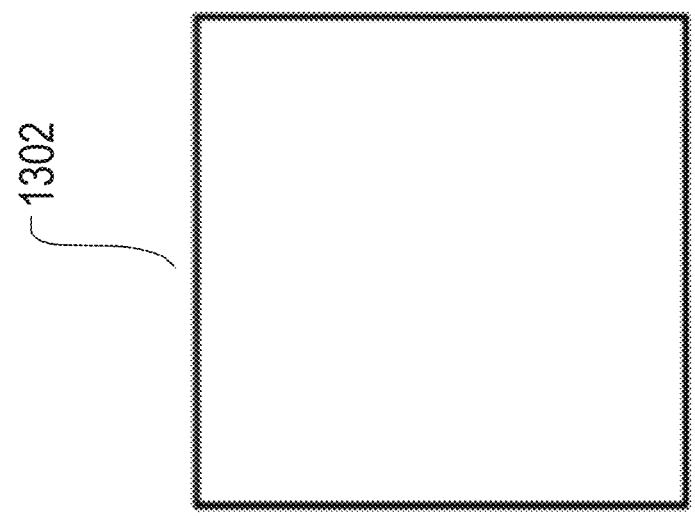
FIG. 13

```
Cos128_Lookup[ 65 ] = {
4096, 4095, 4091, 4085, 4076, 4065, 4052, 4036,
4017, 3996, 3973, 3948, 3920, 3889, 3857, 3822,
3784, 3745, 3703, 3659, 3612, 3564, 3513, 3461,
3406, 3349, 3290, 3229, 3166, 3102, 3035, 2967,
2896, 2824, 2751, 2675, 2598, 2520, 2440, 2359,
2276, 2191, 2106, 2019, 1931, 1842, 1751, 1660,
1567, 1474, 1380, 1285, 1189, 1092, 995, 897,
799, 700, 601, 501, 401, 301, 201, 101, 0
}
```

*FIG. 18*

| Symbol | Value |
|---|---|
| SINPL_1_9 | 1321 |
| SINPL_2_9 | 2482 |
| SINPL_3_9 | 3344 |
| SINPL_4_9 | 3803 |

*FIG. 19*

| DC_PRED | V_PRED | H_PRED | D45_PRED | D135_PRED | D113_PRED | D157_PRED | D203_PRED |
|---|---|---|---|---|---|---|---|
| 0 | 1 | 2 | 3 | 4 | 5 | 6 | 7 |

| D67_PRED | SMOOTH_PRED | SMOOTH_V_PRED | SMOOTH_H_PRED |
|---|---|---|---|
| 8 | 9 | 10 | 11 |

FIG. 21

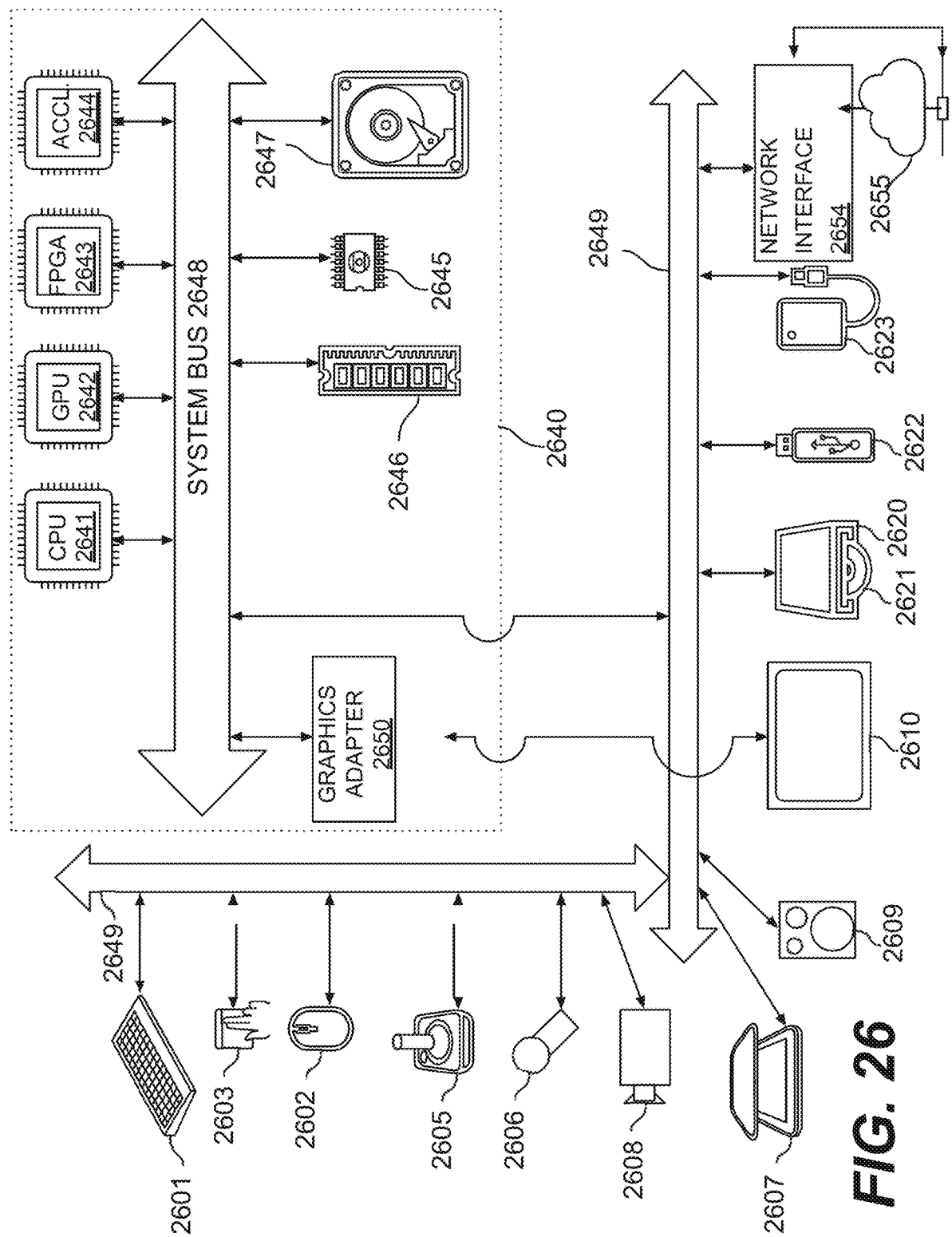

HARMONIZED DESIGN AMONG MULTIPLE REFERENCE LINE INTRA PREDICTION, TRANSFORM PARTITIONING AND TRANSFORM KERNELS

INCORPORATION BY REFERENCE

This application is based on and claims the benefit of priority to U.S. Provisional Application No. 63/176,049, entitled "Harmonized Design Among Multiple Reference Line Intra Prediction, Transform Partitioning, and Transform Kernels", filed on Apr. 16, 2021, which is herein incorporated by reference in its entirety.

TECHNICAL FIELD

This disclosure relates generally to a set of advanced video coding/decoding technologies and more specifically to a harmonized design among multiple reference line intra prediction, transform partitioning, and transform kernels.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Video coding and decoding can be performed using inter-picture prediction with motion compensation. Uncompressed digital video can include a series of pictures, with each picture having a spatial dimension of, for example, 1920×1080 luminance samples and associated full or sub-sampled chrominance samples. The series of pictures can have a fixed or variable picture rate (alternatively referred to as frame rate) of, for example, 60 pictures per second or 60 frames per second. Uncompressed video has specific bitrate requirements for streaming or data processing. For example, video with a pixel resolution of 1920×1080, a frame rate of 60 frames/second, and a chroma subsampling of 4:2:0 at 8 bit per pixel per color channel requires close to 1.5 Gbit/s bandwidth. An hour of such video requires more than 600 GBytes of storage space.

One purpose of video coding and decoding can be the reduction of redundancy in the uncompressed input video signal, through compression. Compression can help reduce the aforementioned bandwidth and/or storage space requirements, in some cases, by two orders of magnitude or more. Both lossless compression and lossy compression, as well as a combination thereof can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application albeit some information loss. In the case of video, lossy compression is widely employed in many applications. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and decoder can utilize techniques from several broad categories and steps, including, for example, motion compensation, Fourier transform, quantization, and entropy coding.

Video codec technologies can include techniques known as intra coding. In intra coding, sample values are represented without reference to samples or other data from previously reconstructed reference pictures. In some video codecs, a picture is spatially subdivided into blocks of samples. When all blocks of samples are coded in intra mode, that picture can be referred to as an intra picture. Intra pictures and their derivatives such as independent decoder refresh pictures, can be used to reset the decoder state and can, therefore, be used as the first picture in a coded video bitstream and a video session, or as a still image. The samples of a block after intra prediction can then be subject to a transform into frequency domain, and the transform coefficients so generated can be quantized before entropy coding. Intra prediction represents a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as that known from, for example, MPEG-2 generation coding technologies, does not use intra prediction. However, some newer video compression technologies include techniques that attempt coding/decoding of blocks based on, for example, surrounding sample data and/or metadata that are obtained during the encoding and/or decoding of spatially neighboring, and that precede in decoding order the blocks of data being intra coded or decoded. Such techniques are henceforth called "intra prediction" techniques. Note that in at least some cases, intra prediction uses reference data only from the current picture under reconstruction and not from other reference pictures.

There can be many different forms of intra prediction. When more than one of such techniques are available in a given video coding technology, the technique in use can be referred to as an intra prediction mode. One or more intra prediction modes may be provided in a particular codec. In certain cases, modes can have submodes and/or may be associated with various parameters, and mode/submode information and intra coding parameters for blocks of video can be coded individually or collectively included in mode codewords. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). Generally, for intra prediction, a predictor block can be formed using neighboring sample values that have become available. For example, available values of particular set of neighboring samples along certain direction and/or lines may be copied into the predictor block. A reference to the direction in use can be coded in the bitstream or may itself be predicted.

Referring to FIG. 1A, depicted in the lower right is a subset of nine predictor directions specified in H.265's 33 possible intra predictor directions (corresponding to the 33 angular modes of the 35 intra modes specified in H.265). The point where the arrows converge (101) represents the sample being predicted. The arrows represent the direction from which neighboring samples are used to predict the sample at 101. For example, arrow (102) indicates that sample (101) is predicted from a neighboring sample or samples to the upper right, at a 45 degree angle from the horizontal direction. Similarly, arrow (103) indicates that sample (101) is predicted from a neighboring sample or samples to the lower left of sample (101), in a 22.5 degree angle from the horizontal direction.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are example reference samples that follow a similar numbering scheme. A reference sample is labelled with an R, its Y position (e.g., row index) and X position (column index) relative to block (104). In both H.264 and H.265, prediction samples adjacently neighboring the block under reconstruction are used.

Intra picture prediction of block 104 may begin by copying reference sample values from the neighboring samples according to a signaled prediction direction. For example, assuming that the coded video bitstream includes signaling that, for this block 104, indicates a prediction direction of arrow (102)—that is, samples are predicted from a prediction sample or samples to the upper right, at a 45-degree angle from the horizontal direction. In such a case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has continued to develop. In H.264 (year 2003), for example, nine different direction are available for intra prediction. That increased to 33 in H.265 (year 2013), and JEM/VVC/BMS, at the time of this disclosure, can support up to 65 directions. Experimental studies have been conducted to help identify the most suitable intra prediction directions, and certain techniques in the entropy coding may be used to encode those most suitable directions in a small number of bits, accepting a certain bit penalty for directions. Further, the directions themselves can sometimes be predicted from neighboring directions used in the intra prediction of the neighboring blocks that have been decoded.

FIG. 1B shows a schematic (180) that depicts 65 intra prediction directions according to JEM to illustrate the increasing number of prediction directions in various encoding technologies developed over time.

The manner for mapping of bits representing intra prediction directions to the prediction directions in the coded video bitstream may vary from video coding technology to video coding technology; and can range, for example, from simple direct mappings of prediction direction to intra prediction mode, to codewords, to complex adaptive schemes involving most probable modes, and similar techniques. In all cases, however, there can be certain directions for intro prediction that are statistically less likely to occur in video content than certain other directions. As the goal of video compression is the reduction of redundancy, those less likely directions will, in a well-designed video coding technology, may be represented by a larger number of bits than more likely directions.

Inter picture prediction, or inter prediction may be based on motion compensation. In motion compensation, sample data from a previously reconstructed picture or part thereof (reference picture), after being spatially shifted in a direction indicated by a motion vector (MV henceforth), may be used for a prediction of a newly reconstructed picture or picture part (e.g., a block). In some cases, the reference picture can be the same as the picture currently under reconstruction. MVs may have two dimensions X and Y, or three dimensions, with the third dimension being an indication of the reference picture in use (akin to a time dimension).

In some video compression techniques, a current MV applicable to a certain area of sample data can be predicted from other MVs, for example from those other MVs that are related to other areas of the sample data that are spatially adjacent to the area under reconstruction and precede the current MV in decoding order. Doing so can substantially reduce the overall amount of data required for coding the MVs by relying on removing redundancy in correlated MVs, thereby increasing compression efficiency. MV prediction can work effectively, for example, because when coding an input video signal derived from a camera (known as natural video) there is a statistical likelihood that areas larger than the area to which a single MV is applicable move in a similar direction in the video sequence and, therefore, can in some cases be predicted using a similar motion vector derived from MVs of neighboring area. That results in the actual MV for a given area to be similar or identical to the MV predicted from the surrounding MVs. Such an MV in turn may be represented, after entropy coding, in a smaller number of bits than what would be used if the MV is coded directly rather than predicted from the neighboring MV(s). In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 specifies, described below is a technique henceforth referred to as "spatial merge".

Specifically, referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block uses.

SUMMARY

Aspects of the disclosure relates generally to a set of advanced video coding/decoding technologies and more specifically to a harmonized design among multiple reference line intra prediction, transform partitioning, and transform kernels.

In some example implementations, a method for processing video information is disclosed. The method includes retrieving a data block of a video frame, the data block having an adjacent reference line and one or more non-adjacent reference lines in the video frame; determining whether one of the one or more non-adjacent reference lines is to be used for intra prediction of the data block. When an adjacent reference line is used for the intra prediction of the data block, selecting a target transform kernel from a first set of transform kernels to transform the data block, and when a non-adjacent reference line is used for the intra prediction of the data block, selecting the target transform kernel from a second set of transform kernels to transform the data block.

In the implementations above, the first set of transform kernels and second set of transform kernels are primary transform kernels or secondary transform kernels.

In any one of the implementations above, the first set of transform kernels may include a superset of transform kernels, and the second set of transform kernels may include a subset of the superset of the transform kernels. The first set of transform kernels and second set of transform kernels may be primary transform kernels, and the second set of transform kernels may include one of a combination of DCT type 2 and ADST as a hybrid transform kernel; a combination of DCT type 2, ADST, and flipped ADST as the hybrid transform kernel; a combination of DCT type 2 and IDT as the hybrid transform kernel; or a combination of DCT type 2, ADST, flipped ADST, and IDT as the hybrid transform kernel.

In any one of the implementations above, the first set of transform kernels and the second set of transform kernels may be secondary transform kernels, and when the data block further includes two or more transform partition blocks, the second set of transform kernels may constitute a subset of the first set of transform kernels. In some further implementations, the data block may include two or more transform partition blocks, and the second set of transform kernels comprises a NULL set. In some other implementations, the data block may include two or more transform partition blocks; and selection of the transform kernel from the first set of transform kernels or the second set of transform kernels is separately signaled for each of the two or more transform partition blocks.

In any one of the implementations above, first set of transform kernels and second transform kernels may be primary transform kernels, and when the data block further comprises two or more transform partition blocks, the second set of transform kernels may constitute a subset of the first set of transform kernels. In some implementations, the data block may include two or more transform partition blocks; and selection of the transform kernel from the first set of transform kernels or the second set of transform kernels is separately signaled for each of the two or more transform partition blocks. In some implementations, the data block may include two or more transform partition blocks, and selection from the second set of transform kernels is predefined and is not signaled in a bitstream associated with the video frame when a non-adjacent reference line is specified.

In any one of the implementations above, a reference line index associated with a reference line used for intra prediction of the data block among the adjacent reference line or the one or more non-adjacent reference lines is used to derive a context for entropy coding of a kernel index for a primary transform kernel for transforming a secondary transform kernel selected from the first set of transform kernels or the second set of transform kernels.

In any one of the implementations above, when the data block further includes two or more transform partition blocks, the second set of transform kernels may constitute a subset of the first set of transform kernel for a subset of the two or more transform partition blocks, and the second set of the transform kernels and the first set of transform kernels may be the same for remaining subset of the two or more transform partition blocks. In some implementations, the subset of the two or more transform partition blocks may include upper or left transform partitions of the data block.

In any one of the implementations above, the selection of the target transform kernel from the first set of transform kernels or the second transform kernels may be performed in response to multiple transform partition types are enabled for partitioning the data block into transform blocks being enabled and both primary and secondary transform being enabled for the data block.

In some Implementations, another method for processing video information is disclosed. The method may include retrieving a data block of a video frame, the data block having an adjacent reference line and one or more non-adjacent reference lines in the video frame; determining whether one of the one or more non-adjacent reference lines is to be used for intra prediction of the data block. When the adjacent reference line is used for the intra prediction of the data block, selecting from a first set of transform partition types for partition the data block into transform partition blocks; and when a non-adjacent reference line is used for the intra prediction of the data block, selecting from a second set of transform partition types for partition the data block into transform partition blocks.

In the implementations above, the second set of transform partition types may only include a partition type for no partitions. In some implementations, the second set of transform partition types may constitute a subset of the first set of transform partition types; and the second set of transform partition types are each associated with number of partitions smaller than a predetermined threshold.

Another method for processing video information is disclosed. The method includes retrieving a data block of a video frame, the data block having one or more reference lines in the video frame for intra prediction, each reference line being associated with a reference line position index; selecting a reference line among the one or more reference lines for intra prediction of the data block; and selecting a primary or secondary transform kernel from a subset of primary or secondary transform kernels for processing the data block, the subset of primary or secondary transform kernels being selected from a full set of primary or secondary transform kernels based on the reference line position index of the selected reference line for intra prediction.

In the implementations above, the subset of primary or secondary transformation kernels may be the same for all non-adjacent reference lines when selected for intra prediction.

In some implementations, a video device is disclosed. The video device may include processing circuitry configured to implement each of the methods above.

Aspects of the disclosure also provide non-transitory computer-readable media storing instructions which when executed by a computer for video decoding and/or encoding cause the computer to perform any one of the method implementations above for video decoding and/or encoding.

BRIEF DESCRIPTION OF THE DRAWINGS

Further features, the nature, and various advantages of the disclosed subject matter will be more apparent from the following detailed description and the accompanying drawings in which:

FIG. 13 shows a scheme for partitioning a coding block into multiple transform blocks and coding order of the transform blocks according to example embodiments of the disclosure.

FIG. 18 shows various DCT-2, DCT-4 partial butterfly lookup table according to example embodiments of the disclosure.

FIG. 19 shows DST-7 partial butterfly lookup table according to example embodiments of the disclosure.

FIG. 21 shows a secondary transform set selection according to example embodiments of the disclosure.

FIG. 26 shows a schematic illustration of a computer system in accordance with example embodiments of the disclosure.

DETAILED DESCRIPTION OF EMBODIMENTS

Figure 3:
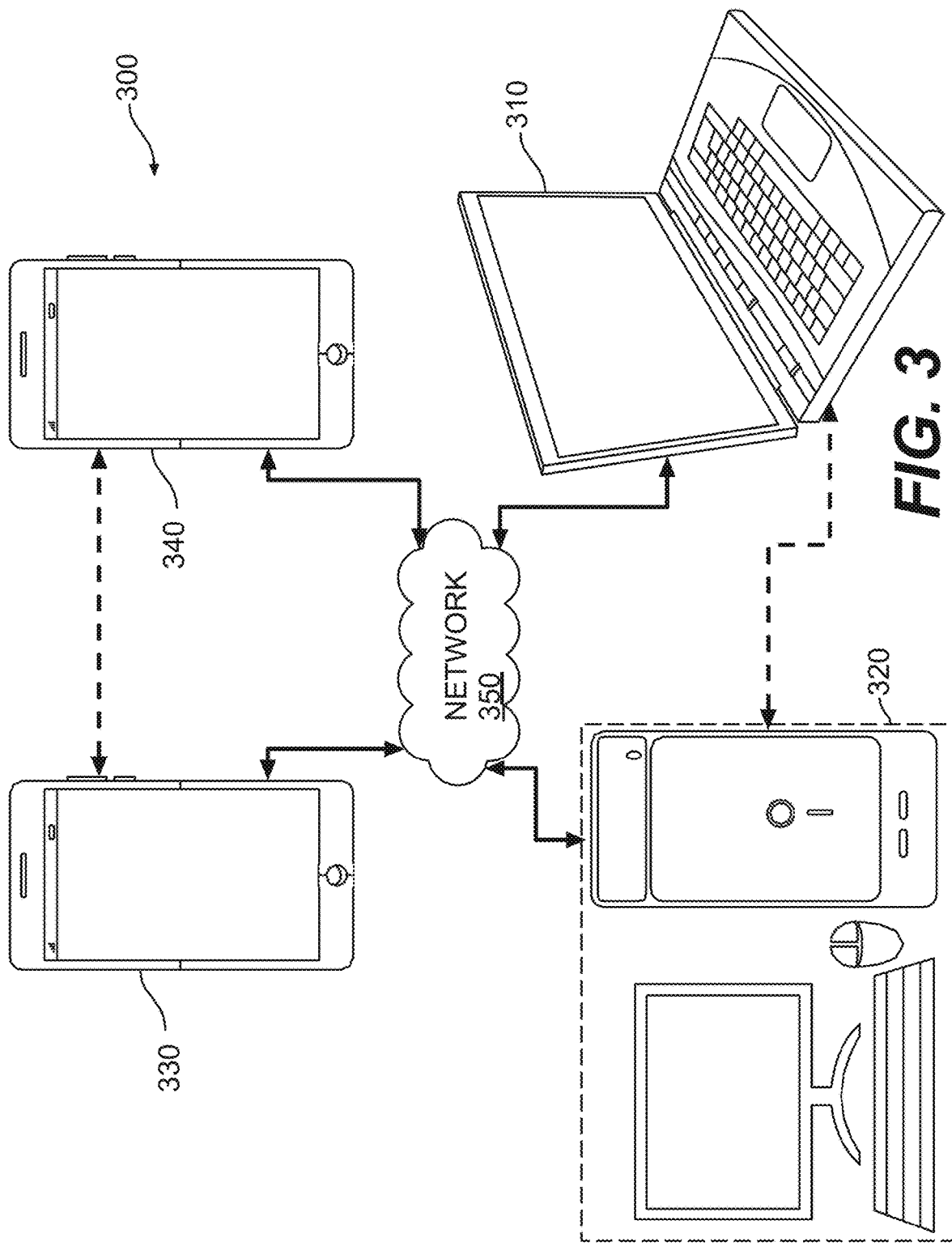
FIG. 3 shows a schematic illustration of a simplified block diagram of a communication system (300) in accordance with an example embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the example of FIG. 3, the first pair of terminal devices (310) and (320) may perform unidirectional transmission of data. For example, the terminal device (310) may code video data (e.g., of a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display the video pictures according to the recovered video data. Unidirectional data transmission may be implemented in media serving applications and the like.

In another example, the communication system (300) includes a second pair of terminal devices (330) and (340) that perform bidirectional transmission of coded video data that may be implemented, for example, during a videoconferencing application. For bidirectional transmission of data, in an example, each terminal device of the terminal devices (330) and (340) may code video data (e.g., of a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display the video pictures at an accessible display device according to the recovered video data.

In the example of FIG. 3, the terminal devices (310), (320), (330) and (340) may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (350) represents any number or types of networks that convey coded video data among the terminal devices (310), (320), (330) and (340), including for example wireline (wired) and/or wireless communication networks. The communication network (350)9 may exchange data in circuit-switched, packet-switched, and/or other types of channels. Representative networks include telecommunications networks, local area networks, wide area networks and/or the Internet. For the purposes of the present discussion, the architecture and topology of the network (350) may be immaterial to the operation of the present disclosure unless explicitly explained herein.

Figure 4:
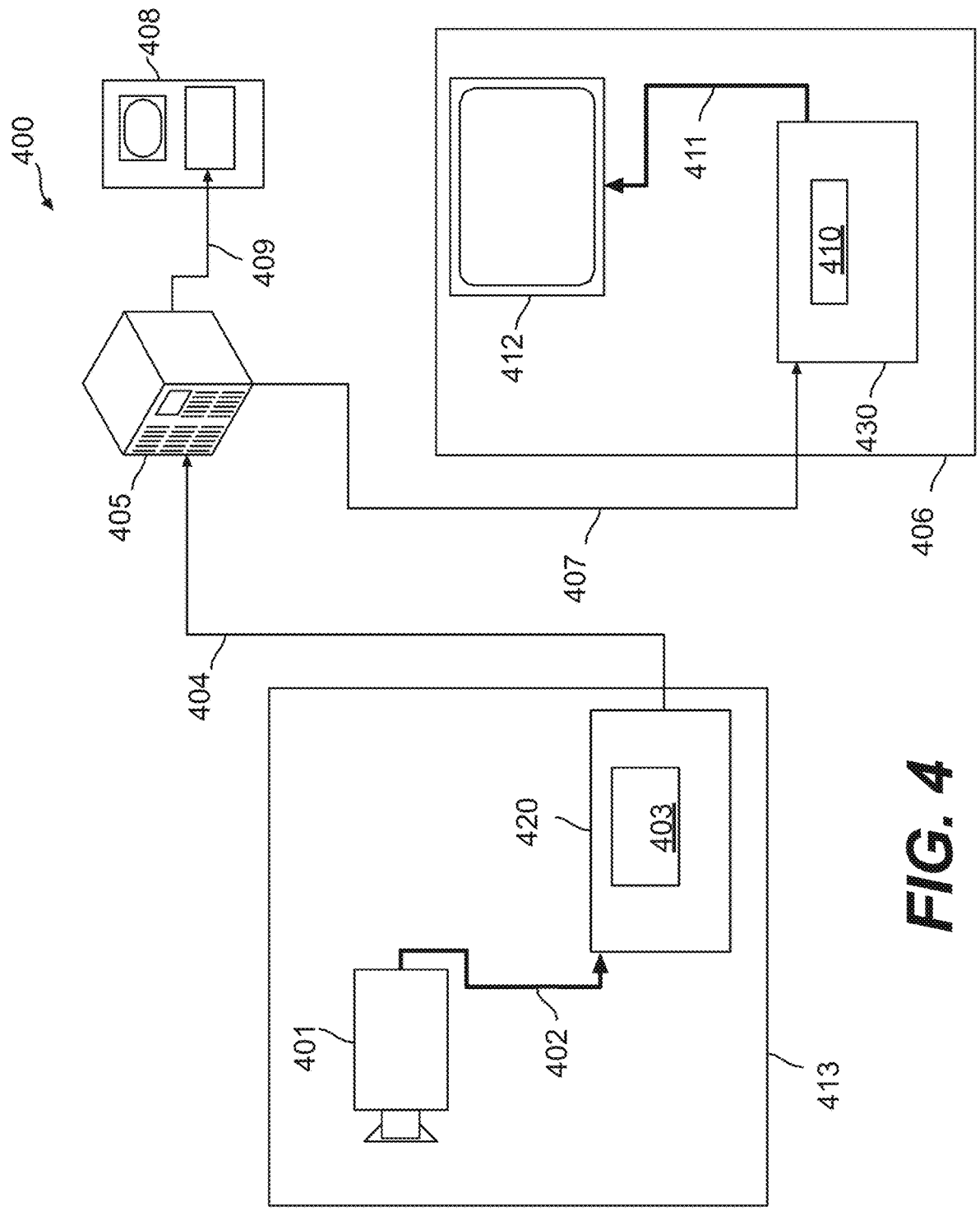
FIG. 4 shows a schematic illustration of a simplified block diagram of a communication system (400) in accordance with an example embodiment.

FIG. 4 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

A video streaming system may include a video capture subsystem (413) that can include a video source (401), e.g., a digital camera, for creating a stream of video pictures or images (402) that are uncompressed. In an example, the stream of video pictures (402) includes samples that are recorded by a digital camera of the video source 401. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize a lower data volume when compared to the stream of uncompressed video pictures (402), can be stored on a streaming server (405) for future use or directly to downstream video devices (not shown). One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that are uncompressed and that can be rendered on a display (412) (e.g., a display screen) or other rendering devices (not depicted). The video decoder 410 may be configured to perform some or all of the various functions described in this disclosure. In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC, and other video coding standards.

It is noted that the electronic devices (420) and (430) can include other components (not shown). For example, the electronic device (420) can include a video decoder (not shown) and the electronic device (430) can include a video encoder (not shown) as well.

Figure 5:
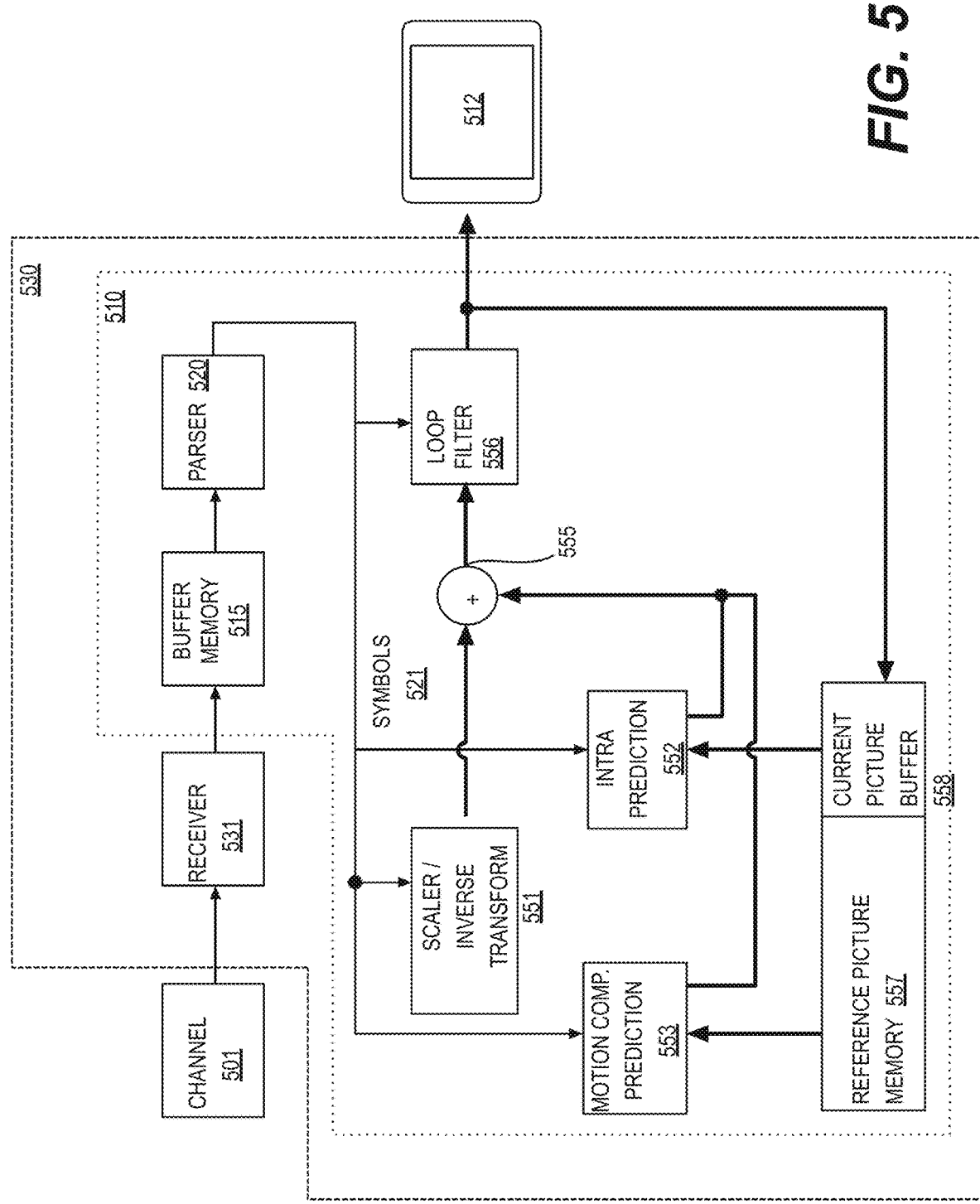
FIG. 5 shows a schematic illustration of a simplified block diagram of a video decoder in accordance with an example embodiment.

FIG. 5 shows a block diagram of a video decoder (510) according to any embodiment of the present disclosure below. The video decoder (510) can be included in an electronic device (530). The electronic device (530) can include a receiver (531) (e.g., receiving circuitry). The video decoder (510) can be used in place of the video decoder (410) in the example of FIG. 4.

The receiver (531) may receive one or more coded video sequences to be decoded by the video decoder (510). In the same or another embodiment, one coded video sequence may be decoded at a time, where the decoding of each coded video sequence is independent from other coded video sequences. Each video sequence may be associated with multiple video frames or images. The coded video sequence may be received from a channel (501), which may be a hardware/software link to a storage device which stores the encoded video data or a streaming source which transmits the encoded video data. The receiver (531) may receive the encoded video data with other data such as coded audio data and/or ancillary data streams, that may be forwarded to their respective processing circuitry (not depicted). The receiver (531) may separate the coded video sequence from the other data. To combat network jitter, a buffer memory (515) may be disposed in between the receiver (531) and an entropy decoder/parser (520) ("parser (520)" henceforth). In certain applications, the buffer memory (515) may be implemented as part of the video decoder (510). In other applications, it can be outside of and separate from the video decoder (510) (not depicted). In still other applications, there can be a buffer memory (not depicted) outside of the video decoder (510) for the purpose of, for example, combating network jitter, and there may be another additional buffer memory (515) inside the video decoder (510), for example to handle playback timing. When the receiver (531) is receiving data from a store/forward device of sufficient bandwidth and controllability, or from an isosynchronous network, the buffer memory (515) may not be needed, or can be small. For use on best-effort packet networks such as the Internet, the buffer memory (515) of sufficient size may be required, and its size can be comparatively large. Such buffer memory may be implemented with an adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as display (512) (e.g., a display screen) that may or may not an integral part of the electronic device (530) but can be coupled to the electronic device (530), as is shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received by the parser (520). The entropy coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the subgroups. The subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients (e.g., Fourier transform coefficients), quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different processing or functional units depending on the type of the coded video picture or parts thereof (such as: inter and intra picture, inter and intra block), and other factors. The units that are involved and how they are involved may be controlled by the subgroup control information that was parsed from the coded video sequence by the parser (520). The flow of such subgroup control information between the parser (520) and the multiple processing or functional units below is not depicted for simplicity.

Beyond the functional blocks already mentioned, the video decoder (510) can be conceptually subdivided into a number of functional units as described below. In a practical implementation operating under commercial constraints, many of these functional units interact closely with each other and can, at least partly, be integrated with one another. However, for the purpose of describing the various functions of the disclosed subject matter with clarity, the conceptual subdivision into the functional units is adopted in the disclosure below.

A first unit may include the scaler/inverse transform unit (551). The scaler/inverse transform unit (551) may receive a quantized transform coefficient as well as control information, including information indicating which type of inverse transform to use, block size, quantization factor/parameters, quantization scaling matrices, and the lie as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block, i.e., a block that does not use predictive information from previously reconstructed pictures, but can use predictive information from previously reconstructed parts of the current picture. Such predictive information can be provided by an intra picture prediction unit (552). In some cases, the intra picture prediction unit (552) may generate a block of the same size and shape of the block under reconstruction using surrounding block information that is already reconstructed and stored in the current picture buffer (558). The current picture buffer (558) buffers, for example, partly reconstructed current picture and/or fully reconstructed current picture. The aggregator (555), in some implementations, may add, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for inter-picture prediction. After motion compensating the fetched samples in accordance with the symbols (521) pertaining to the block, these samples can be added by the aggregator (555) to the output of the scaler/inverse transform unit (551) (output of unit 551 may be referred to as the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y components (shift), and reference picture components (time). Motion compensation may also include interpolation of sample values as fetched from the reference picture memory (557) when sub-sample exact motion vectors are in use, and may also be associated with motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values. Several type of loop filters may be included as part of the loop filter unit 556 in various orders, as will be described in further detail below.

The output of the loop filter unit (556) can be a sample stream that can be output to the rendering device (512) as well as stored in the reference picture memory (557) for use in future inter-picture prediction.

Certain coded pictures, once fully reconstructed, can be used as reference pictures for future inter-picture prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology adopted in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools from all the tools available in the video compression technology or standard as the only tools available for use under that profile. To be standard-compliant, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In some example embodiments, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
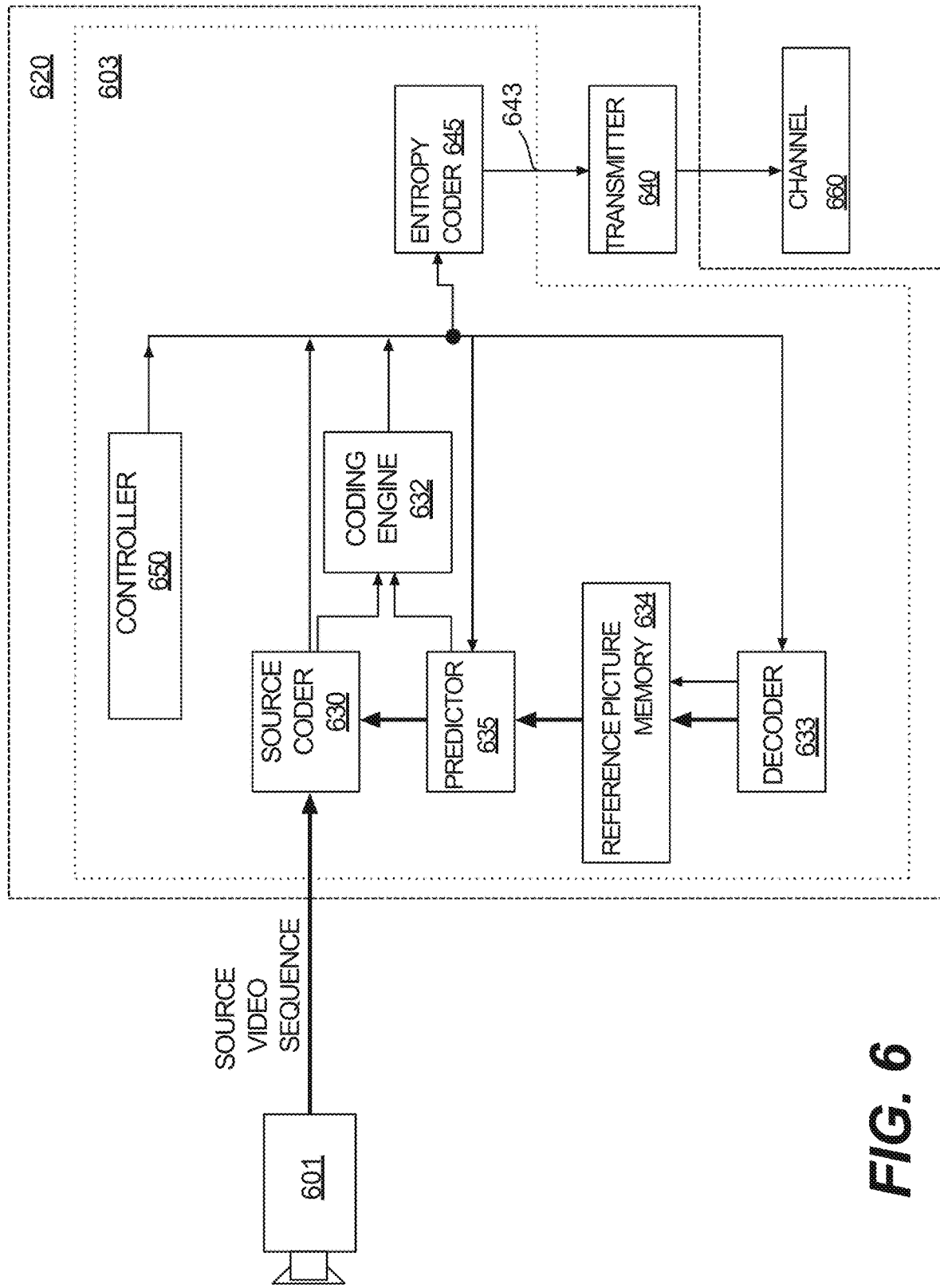
FIG. 6 shows a schematic illustration of a simplified block diagram of a video encoder in accordance with an example embodiment.

FIG. 6 shows a block diagram of a video encoder (603) according to an example embodiment of the present disclosure. The video encoder (603) may be included in an electronic device (620). The electronic device (620) may further include a transmitter (640) (e.g., transmitting circuitry). The video encoder (603) can be used in place of the video encoder (403) in the example of FIG. 4.

The video encoder (603) may receive video samples from a video source (601) (that is not part of the electronic device (620) in the example of FIG. 6) that may capture video image(s) to be coded by the video encoder (603). In another example, the video source (601) may be implemented as a portion of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 YCrCb, RGB, XYZ . . . ), and any suitable sampling structure (for example YCrCb 4:2:0, YCrCb 4:4:4). In a media serving system, the video source (601) may be a storage device capable of storing previously prepared video. In a videoconferencing system, the video source (601) may be a camera that captures local image information as a video sequence. Video data may be provided as a plurality of individual pictures or images that impart motion when viewed in sequence. The pictures themselves may be organized as a spatial array of pixels, wherein each pixel can comprise one or more samples depending on the sampling structure, color space, and the like being in use. A person having ordinary skill in the art can readily understand the relationship between pixels and samples. The description below focuses on samples.

According to some example embodiments, the video encoder (603) may code and compress the pictures of the source video sequence into a coded video sequence (643) in real time or under any other time constraints as required by the application. Enforcing appropriate coding speed constitutes one function of a controller (650). In some embodiments, the controller (650) may be functionally coupled to and control other functional units as described below. The coupling is not depicted for simplicity. Parameters set by the controller (650) can include rate control related parameters (picture skip, quantizer, lambda value of rate-distortion optimization techniques, . . . ), picture size, group of pictures (GOP) layout, maximum motion vector search range, and the like. The controller (650) can be configured to have other suitable functions that pertain to the video encoder (603) optimized for a certain system design.

In some example embodiments, the video encoder (603) may be configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder would create even though the embedded decoder 633 process coded video steam by the source coder 630 without entropy coding (as any compression between symbols and coded video bitstream in entropy coding may be lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used to improve coding quality.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633) in the encoder.

An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (630) may perform motion compensated predictive coding, which codes an input picture predictively with reference to one or more previously coded picture from the video sequence that were designated as "reference pictures." In this manner, the coding engine (632) codes differences (or residue) in the color channels between pixel blocks of an input picture and pixel blocks of reference picture(s) that may be selected as prediction reference(s) to the input picture. The term "residue" and its adjective form "residual" may be used interchangeably.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end (remote) video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compression of the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person having ordinary skill in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample coding blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures. The source pictures or the intermediate processed pictures may be subdivided into other types of blocks for other purposes. The division of coding blocks and the other types of blocks may or may not follow the same manner, as described in further detail below.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data may accordingly conform to a syntax specified by the video coding technology or standard being used.

In some example embodiments, the transmitter (640) may transmit additional data with the encoded video. The source coder (630) may include such data as part of the coded video sequence. The additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) utilizes spatial correlation in a given picture, and inter-picture prediction utilizes temporal or other correlation between the pictures. For example, a specific picture under encoding/decoding, which is referred to as a current picture, may be partitioned into blocks. A block in the current picture, when similar to a reference block in a previously coded and still buffered reference picture in the video, may be coded by a vector that is referred to as a motion vector. The motion vector points to the reference block in the reference picture, and can have a third dimension identifying the reference picture, in case multiple reference pictures are in use.

In some example embodiments, a bi-prediction technique can be used for inter-picture prediction. According to such bi-prediction technique, two reference pictures, such as a first reference picture and a second reference picture that both proceed the current picture in the video in decoding order (but may be in the past or future, respectively, in display order) are used. A block in the current picture can be coded by a first motion vector that points to a first reference block in the first reference picture, and a second motion vector that points to a second reference block in the second reference picture. The block can be jointly predicted by a combination of the first reference block and the second reference block.

Further, a merge mode technique may be used in the inter-picture prediction to improve coding efficiency.

According to some example embodiments of the disclosure, predictions, such as inter-picture predictions and intra-picture predictions are performed in the unit of blocks. For example, a picture in a sequence of video pictures is partitioned into coding tree units (CTU) for compression, the CTUs in a picture may have the same size, such as 64×64 pixels, 32×32 pixels, or 16×16 pixels. In general, a CTU may include three parallel coding tree blocks (CTBs): one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels. Each of the one or more of the 32×32 block may be further split into 4 CUs of 16×16 pixels. In some example embodiments, each CU may be analyzed during encoding to determine a prediction type for the CU among various prediction types such as an inter prediction type or an intra prediction type. The CU may be split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. The split of a CU into PU (or PBs of different color channels) may be performed in various spatial pattern. A luma or chroma PB, for example, may include a matrix of values (e.g., luma values) for samples, such as 8×8 pixels, 16×16 pixels, 8×16 pixels, 16×8 samples, and the like.

Figure 7:
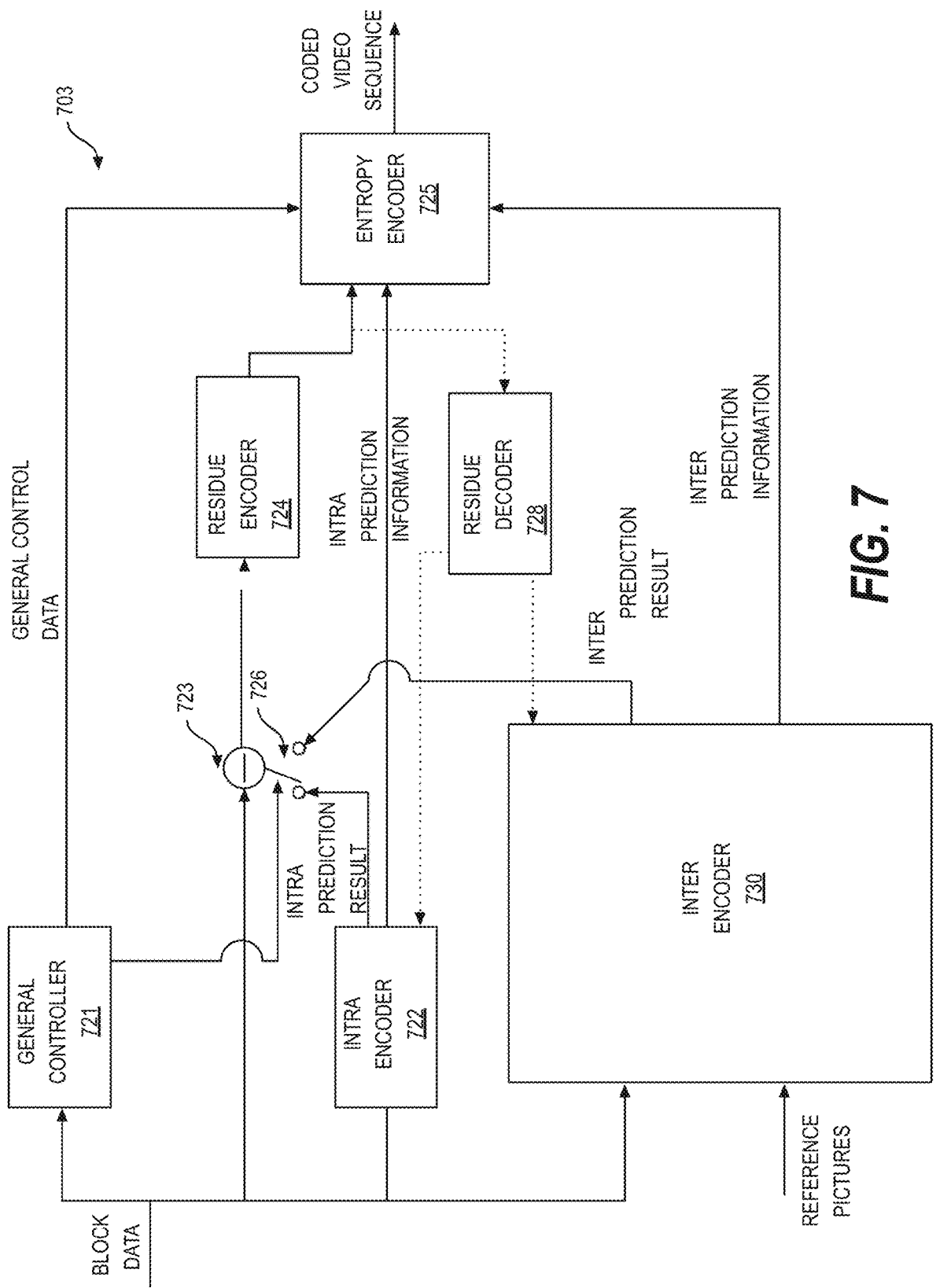
FIG. 7 shows a block diagram of a video encoder in accordance with another example embodiment.

FIG. 7 shows a diagram of a video encoder (703) according to another example embodiment of the disclosure. The video encoder (703) is configured to receive a processing block (e.g., a prediction block) of sample values within a current video picture in a sequence of video pictures, and encode the processing block into a coded picture that is part of a coded video sequence. The example video encoder (703) may be used in place of the video encoder (403) in the FIG. 4 example.

For example, the video encoder (703) receives a matrix of sample values for a processing block, such as a prediction block of 8×8 samples, and the like. The video encoder (703) then determines whether the processing block is best coded using intra mode, inter mode, or bi-prediction mode using, for example, rate-distortion optimization (RDO). When the processing block is determined to be coded in intra mode, the video encoder (703) may use an intra prediction technique to encode the processing block into the coded picture; and when the processing block is determined to be coded in inter mode or bi-prediction mode, the video encoder (703) may use an inter prediction or bi-prediction technique, respectively, to encode the processing block into the coded picture. In some example embodiments, a merge mode may be used as a submode of the inter picture prediction where the motion vector is derived from one or more motion vector predictors without the benefit of a coded motion vector component outside the predictors. In some other example embodiments, a motion vector component applicable to the subject block may be present. Accordingly, the video encoder (703) may include components not explicitly shown in FIG. 7, such as a mode decision module, to determine the perdition mode of the processing blocks.

In the example of FIG. 7, the video encoder (703) includes an inter encoder (730), an intra encoder (722), a residue calculator (723), a switch (726), a residue encoder (724), a general controller (721), and an entropy encoder (725) coupled together as shown in the example arrangement in FIG. 7.

The inter encoder (730) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information using the decoding unit 633 embedded in the example encoder 620 of FIG. 6 (shown as residual decoder 728 of FIG. 7, as described in further detail below).

The intra encoder (722) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques). The intra encoder (722) may calculates intra prediction results (e.g., predicted block) based on the intra prediction information and reference blocks in the same picture.

The general controller (721) may be configured to determine general control data and control other components of the video encoder (703) based on the general control data. In an example, the general controller (721) determines the prediction mode of the block, and provides a control signal to the switch (726) based on the prediction mode. For example, when the prediction mode is the intra mode, the general controller (721) controls the switch (726) to select the intra mode result for use by the residue calculator (723), and controls the entropy encoder (725) to select the intra prediction information and include the intra prediction information in the bitstream; and when the predication mode for the block is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) may be configured to calculate a difference (residue data) between the received block and prediction results for the block selected from the intra encoder (722) or the inter encoder (730). The residue encoder (724) may be configured to encode the residue data to generate transform coefficients. For example, the residue encoder (724) may be configured to convert the residue data from a spatial domain to a frequency domain to generate the transform coefficients. The transform coefficients are then subject to quantization processing to obtain quantized transform coefficients. In various example embodiments, the video encoder (703) also includes a residual decoder (728). The residual decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures.

The entropy encoder (725) may be configured to format the bitstream to include the encoded block and perform entropy coding. The entropy encoder (725) is configured to include in the bitstream various information. For example, the entropy encoder (725) may be configured to include the general control data, the selected prediction information (e.g., intra prediction information or inter prediction information), the residue information, and other suitable information in the bitstream. When coding a block in the merge submode of either inter mode or bi-prediction mode, there may be no residue information.

Figure 8:
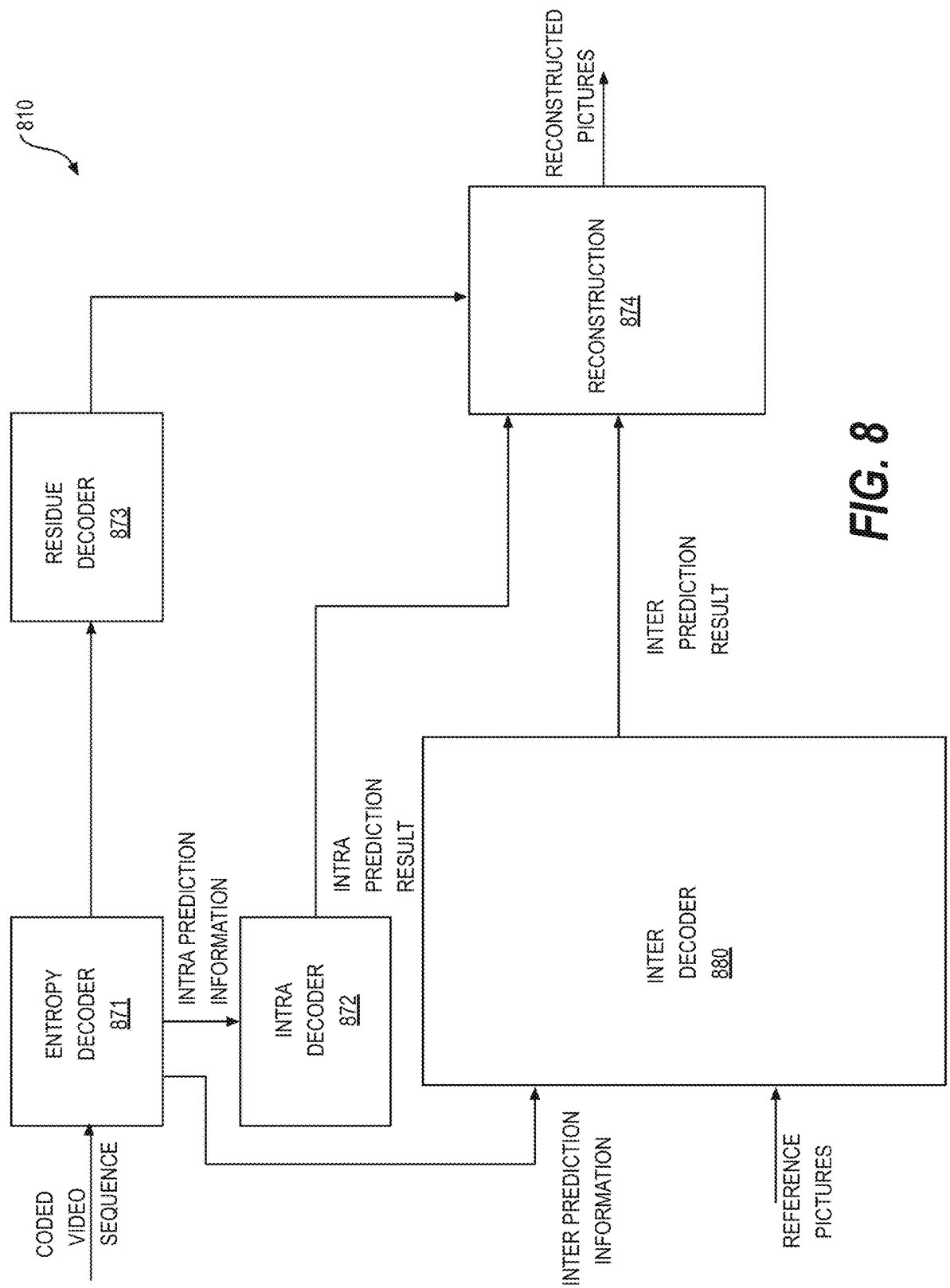
FIG. 8 shows a block diagram of a video decoder in accordance with another example embodiment.

FIG. 8 shows a diagram of an example video decoder (810) according to another embodiment of the disclosure. The video decoder (810) is configured to receive coded pictures that are part of a coded video sequence, and decode the coded pictures to generate reconstructed pictures. In an example, the video decoder (810) may be used in place of the video decoder (410) in the example of FIG. 4.

In the example of FIG. 8, the video decoder (810) includes an entropy decoder (871), an inter decoder (880), a residual decoder (873), a reconstruction module (874), and an intra decoder (872) coupled together as shown in the example arrangement of FIG. 8.

The entropy decoder (871) can be configured to reconstruct, from the coded picture, certain symbols that represent the syntax elements of which the coded picture is made up. Such symbols can include, for example, the mode in which a block is coded (e.g., intra mode, inter mode, bi-predicted mode, merge submode or another submode), prediction information (e.g., intra prediction information or inter prediction information) that can identify certain sample or metadata used for prediction by the intra decoder (872) or the inter decoder (880), residual information in the form of, for example, quantized transform coefficients, and the like. In an example, when the prediction mode is the inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residual decoder (873).

The inter decoder (880) may be configured to receive the inter prediction information, and generate inter prediction results based on the inter prediction information.

The intra decoder (872) may be configured to receive the intra prediction information, and generate prediction results based on the intra prediction information.

The residual decoder (873) may be configured to perform inverse quantization to extract de-quantized transform coefficients, and process the de-quantized transform coefficients to convert the residual from the frequency domain to the spatial domain. The residual decoder (873) may also utilize certain control information (to include the Quantizer Parameter (QP)) which may be provided by the entropy decoder (871) (data path not depicted as this may be low data volume control information only).

The reconstruction module (874) may be configured to combine, in the spatial domain, the residual as output by the residual decoder (873) and the prediction results (as output by the inter or intra prediction modules as the case may be) to form a reconstructed block forming part of the reconstructed picture as part of the reconstructed video. It is noted that other suitable operations, such as a deblocking operation and the like, may also be performed to improve the visual quality.

It is noted that the video encoders (403), (603), and (703), and the video decoders (410), (510), and (810) can be implemented using any suitable technique. In some example embodiments, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Figure 9:
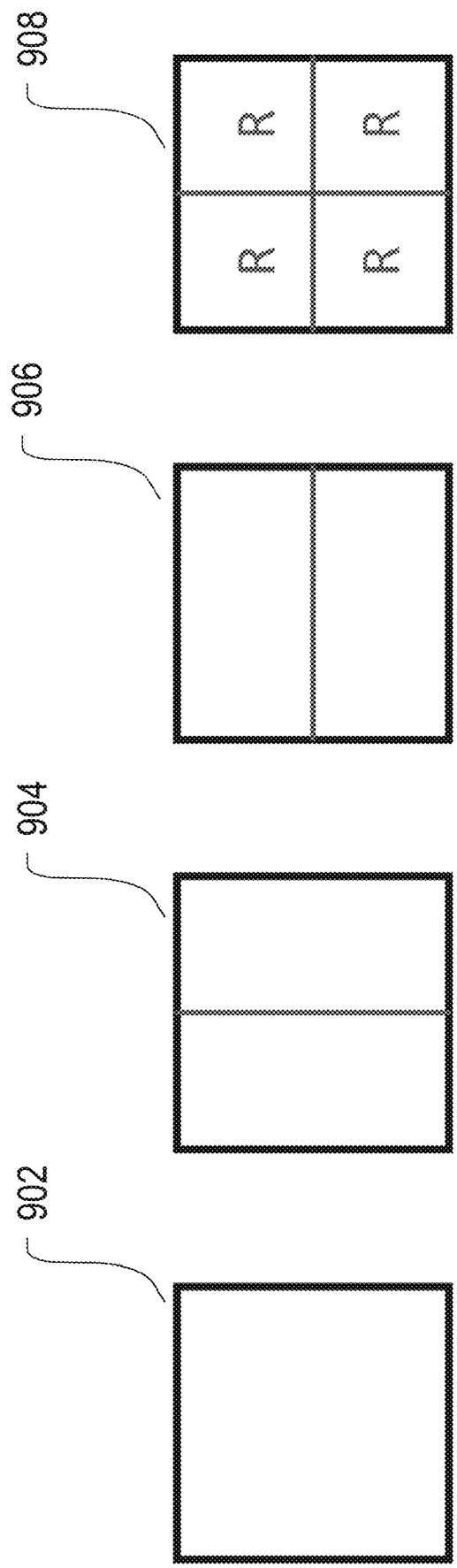
FIG. 9 shows a scheme of coding block partitioning according to example embodiments of the disclosure.

Turing to coding block partitioning, and in some example implementations, a predetermined pattern may be applied. As shown in FIG. 9, an example 4-way partition tree starting from a first predefined level (e.g., 64×64 block level) down to a second predefined level (e.g., 4×4 level) may be employed. For example, a base block may be subject to four partitioning options indicated by 902, 904, 906, and 908, with the partitions designated as R as being allowed for recursive partitions in that the same partition tree as indicated in FIG. 9 may be repeated at a lower scale until the lowest level (e.g., 4×4 level). In some implementations, additional restrictions may be applied to the partitioning scheme of FIG. 9. In the implementation of FIG. 9, rectangular partitions (e.g., 1:2/2:1 rectangular partitions) may be allowed but they may not be allowed to be recursive, whereas a square partitioning is allowed to be recursive. The partitioning following FIG. 9 with recursion, if needed, generates a final set of coding blocks. Such scheme may apply to one or more of the color channels.

Figure 10:
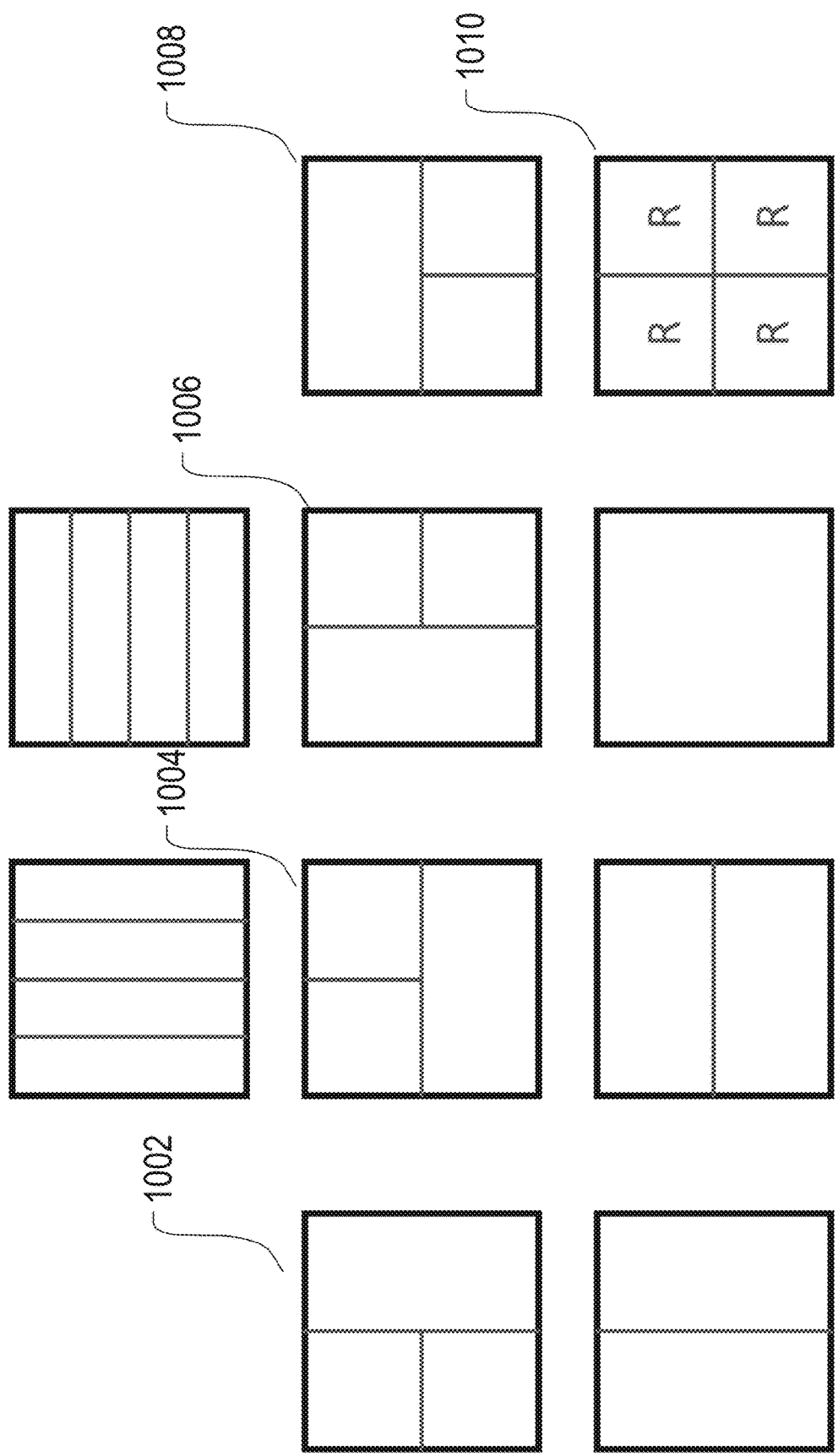
FIG. 10 shows another scheme of coding block partitioning according to example embodiments of the disclosure.

FIG. 10 shows another example predefined partitioning pattern allowing recursive partitioning to form a partitioning tree. As shown in FIG. 10, an example 10-way partitioning structure or pattern may be predefined. The root block may start at a predefined level (e.g. from 128×128 level, or 64×64 level). The example partitioning structure of FIG. 10 includes various 2:1/1:2 and 4:1/1:4 rectangular partitions. The partition types with 3 sub-partitions indicated 1002, 1004, 1006, and 1008 in the second row of FIG. 10 may be referred to "T-type" partitions. The "T-Type" partitions 1002, 1004, 1006, and 1008 may be referred to as Left T-Type, Top T-Type, Right T-Type and Bottom T-Type. In some implementations, none of the rectangular partitions of FIG. 10 is allowed to be further subdivided. A coding tree depth may be further defined to indicate the splitting depth from the root node or root block. For example, the coding tree depth for the root node or root black, e.g. for a 128×128 block, may be set to 0, and after the root block is further split once following FIG. 10, the coding tree depth is increased by 1. In some implementations, only the all-square partitions in 1010 may be allowed for recursive partitioning into the next level of the partitioning tree following pattern of FIG. 10. In other words, recursive partitioning may not be allowed for the square partitions with patterns 1002, 1004, 1006, and 1006. The partitioning following FIG. 10 with recursion, if needed, generates a final set of coding blocks. Such scheme may apply to one or more of the color channels.

After dividing or partitioning a base block following any of the partitioning procedures or other procedures above, again, a final set of partitions or coding block may be obtained. Each of these partitions may be at one of various partitioning levels. Each of the partitions may be referred to as a coding block (CB). For the various example partitioning implementations above, each resulting CB may be of any of the allowed sizes and partitioning levels. They are referred to as coding block because they may form units for which some basic coding/decoding decisions may be made and coding/decoding parameters may be optimized, determined, and signaled in an encoded video bitstream. The highest level in the final partitions represents the depth of the coding block partitioning tree. Coding block may be a luma coding block or a chroma coding block.

In some other example implementations, a quadtree structure may be used for splitting base luma and chroma blocks recursively into coding units. Such splitting structure may be referred to as a coding tree unit (CTU), which is split into coding units (CUs) by using the quadtree structure to adapt the partitioning to various local characteristics of the base CTU. In such implementations, implicit quadtree split may be performed at picture boundary so that a block will keep quad-tree splitting until the size fits the picture boundary. The term CU is used to collectively refer to units of luma and chroma coding blocks (CBs).

In some implementations, a CB may be further partitioned. For example, A CB may be further partitioned into multiple prediction blocks (PBs) for purposes of intra or inter-frame prediction during coding and decoding processes. In other words, a CB may be further divided into different sub partitions, where individual prediction decision/configuration may be made. In parallel, a CB may be further partitioned into a plurality of transform blocks (TBs) for purposes of delineating levels at which transform or inverse transform of video data is performed. The partitioning scheme of a CB into PBs and TBs may or may not be the same. For example, each partitioning scheme may be performed using its own procedure based on, for example, the various characteristics of the video data. The PB and TB partitioning schemes may be independent in some example implementations. The PB and TB partitioning schemes and boundaries may be correlated in some other example implementations. I some implementations, for example, TBs may be partitioned after PB partitions, and in particular, each PB, after being determined following partitioning of a coding block, may then be further partitioned into one or more TBs.

For example, in some implementations, a PB may be split into one, two, four, or other number of TBs.

In some implementations, for partitioning of a base block into coding blocks and further into prediction blocks and/or transform blocks, the luma channel and the chroma channels may be treated differently. For example, in some implementations, partitioning of a coding block into prediction blocks and/or transform blocks may be allowed for the luma channel whereas such partitioning of a coding block into prediction blocks and/or transform blocks may not be allowed for the chroma channel(s). In such implementations, transform and/or prediction of luma blocks thus may be performed only at the coding block level. For another example, minimum transform block size for luma channel and chroma channel(s) may be different, e.g., coding blocks for luma channel may be allowed to be partitioned into smaller transform and/or prediction blocks than the chroma channels. For yet another example, the maximum depth of partitioning of a coding block into transform blocks and/or prediction blocks may be different between the luma channel and the chroma channels, e.g., coding blocks for luma channel may be allowed to be partitioned into deeper transform and/or prediction blocks than the chroma channel(s). For a specific example, luma coding blocks may be partitioned into transform blocks of multiple sizes that can be represented by a recursive partition going down by up to 2 levels, and transform block shapes such as square, 2:1/1:2, and 4:1/1:4 and transform block size from 4×4 to 64×64 may be allowed. For chroma blocks, however, only the largest possible transform blocks specified for the luma blocks may be allowed.

In some example implementations for partitioning of a coding block into PBs, the depth, the shape, and/or other characteristics of the PB partitioning may depend on whether the PB is intra or inter coded.

The partitioning of a coding block (or a prediction block) into transform blocks may be implemented in various example schemes, including but not limited to quadtree splitting and predefined pattern splitting, recursively or non-recursively, and with additional consideration for transform blocks at the boundary of the coding block or prediction block. In general, the resulting transform blocks may be at different split levels, may not be of the same size, and may not need to be square in shape (e.g., they can be rectangular with some allowed sizes and aspect ratios).

In some implementations, coding partition tree schemes or structures may be used. Coding partition tree schemes used for the luma and chroma channels may not need to be the same. In other words, luma and chroma channels may have separate coding tree structures. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, luma channel may be partitioned into CBs by one coding partition tree structure, and the chroma channel may be partitioned into chroma CBs by another coding partition tree structure.

A specific example implementation of coding block and transform block partitioning is described below. In such an example implementation, a base coding block may be split into coding blocks using recursive quadtree splitting described above. At each level, whether further quadtree splitting of a particular partition should continue may be determined by local video data characteristics. The resulting CBs may be at various quadtree splitting levels, of various sizes. The decision on whether to code a picture area using inter-picture (temporal) or intra-picture (spatial) prediction may be made at the CB level (or CU level, for all three-color channels). Each CB may be further split into one, two, four, or other number of PBs according to PB splitting type. Inside one PB, the same prediction process may be applied and the relevant information is transmitted to the decoder on a PB basis. After obtaining the residual block by applying the prediction process based on the PB splitting type, a CB can be partitioned into TBs according to another quadtree structure similar to the coding tree for the CB. In this particular implementation, a CB or a TB may but does not have to be limited to square shape. Further in this particular example, a PB may be square or rectangular shape for an inter-prediction and may only be square for intra-prediction. A coding block may be further split into, e.g., four square-shaped TBs. Each TB may be further split recursively (using quadtree split) into smaller TBs, referred to as Residual Quad-Tree (RQT).

Figure 11:
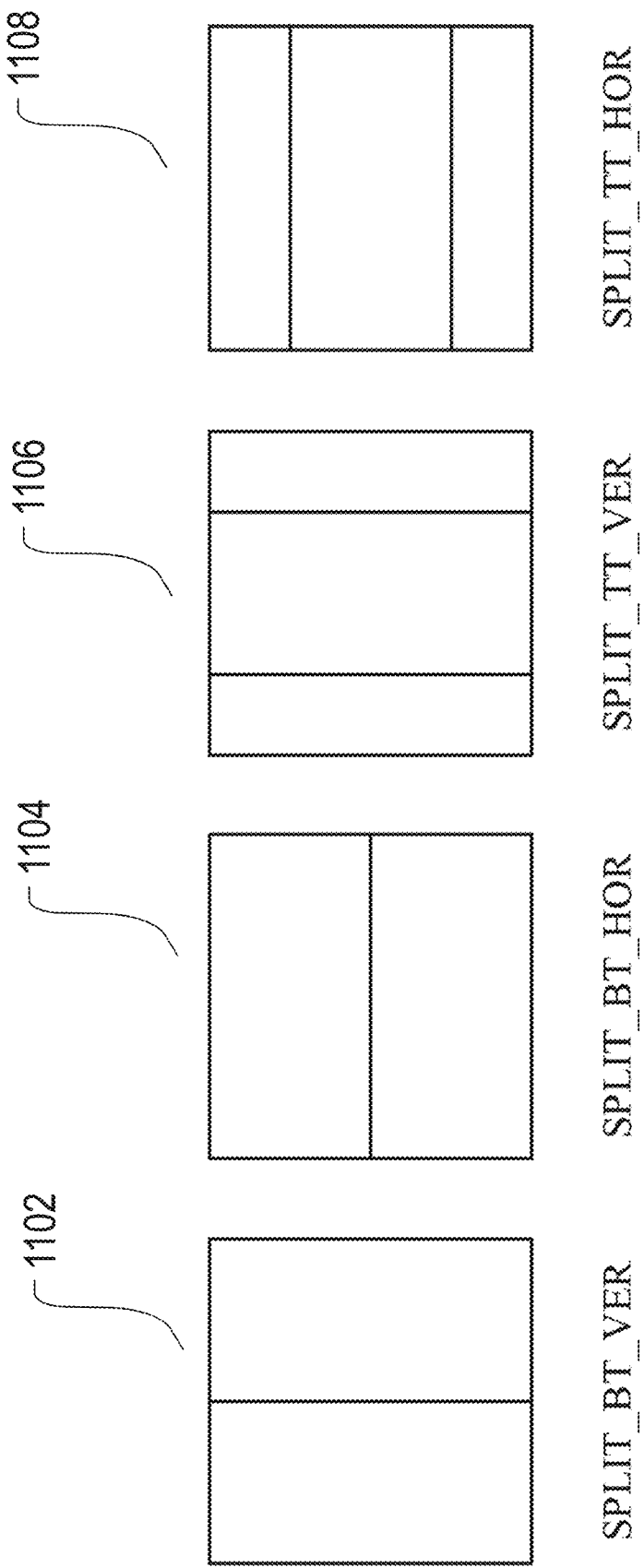
FIG. 11 shows another scheme of coding block partitioning according to example embodiments of the disclosure.

Another specific example for partitioning of a base coding block into CBs and other PBs and or TBs are described below. For example, rather than using a multiple partition unit types such as those shown in FIG. 10, a quadtree with nested multi-type tree using binary and ternary splits segmentation structure may be used. The separation of the CB, PB and TB concepts (i.e., the partitioning of CB into PBs and/or TBs, and the partitioning of PBs into TBs) may be abandoned except when needed for CBs that have a size too large for the maximum transform length, where such CBs may need further splitting. This example portioning scheme may be designed to support more flexibility for CB partition shapes so that the prediction and transform can both be performed on the CB level without further partitioning. In such a coding tree structure, a CB may have either a square or rectangular shape. Specifically, a coding tree block (CTB) may be first partitioned by a quadtree structure. Then the quadtree leaf nodes may be further partitioned by a multi-type tree structure. An example of the multi-type tree structure is shown in FIG. 11. Specifically, the example multi-type tree structure of FIG. 11 includes four splitting types, referred to as vertical binary splitting (SPLIT BT VER) (1102), horizontal binary splitting (SPLIT BT HOR) (1104), vertical ternary splitting (SPLIT TT VER) (1106), and horizontal ternary splitting (SPLIT TT HOR) (1108). The CBs then corresponds to leaves of the multi-type tree. In this example implementation, unless the CB is too large for the maximum transform length, this segmentation is used for both prediction and transform processing without any further partitioning. This means that, in most cases, the CB, PB and TB have the same block size in the quadtree with nested multi-type tree coding block structure. The exception occurs when maximum supported transform length is smaller than the width or height of the colour component of the CB.

Figure 12:
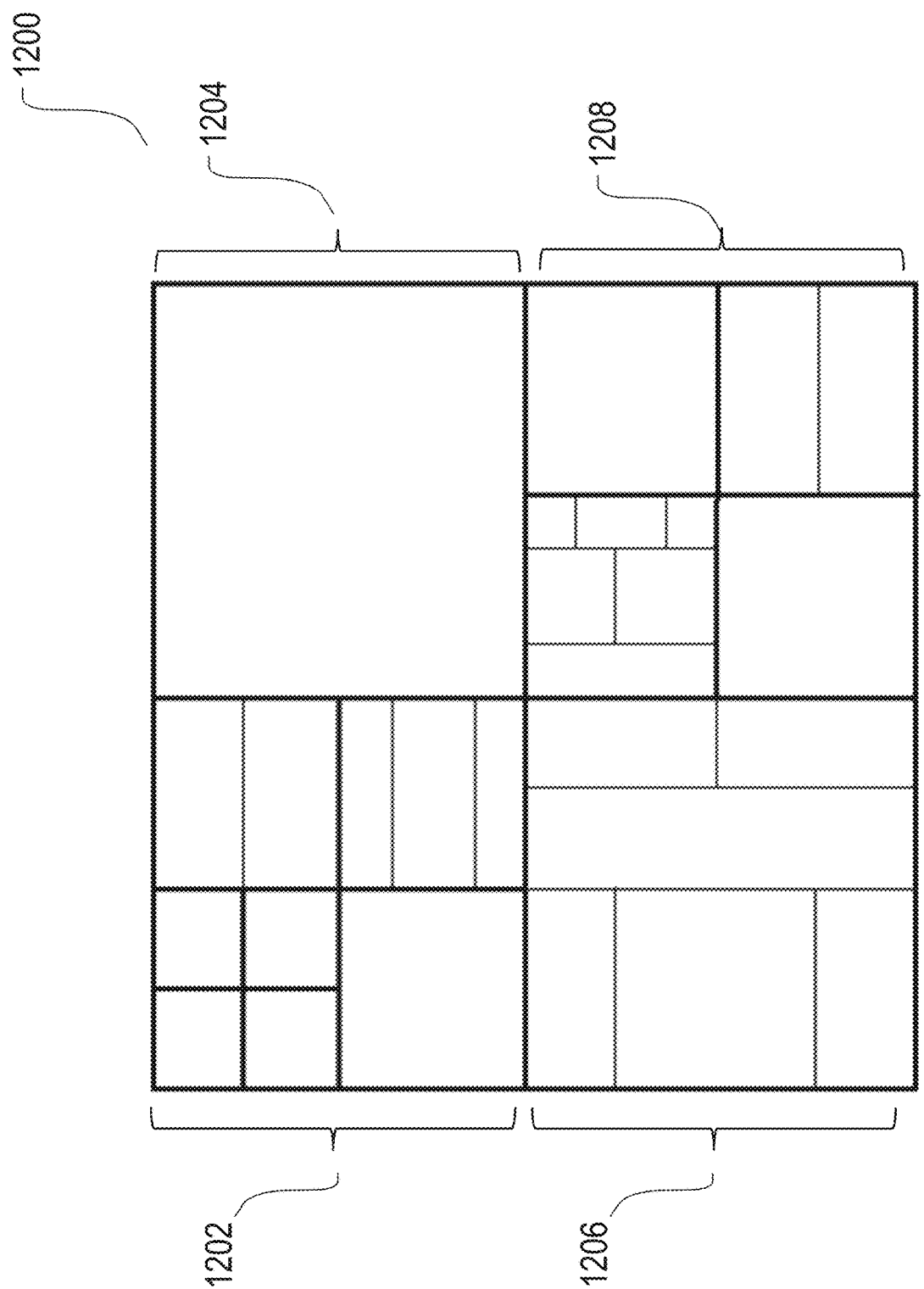
FIG. 12 shows another scheme of coding block partitioning according to example embodiments of the disclosure.

One example for the quadtree with nested multi-type tree coding block structure of block partition for one CTB is shown in FIG. 12. In more detail, FIG. 12 shows that the CTB 1200 is quadtree split into four square partitions 1202, 1204, 1206, and 1208. Decision to further use the multi-type tree structure of FIG. 11 for splitting is made for each of the quadtree-split partitions. In the example of FIG. 12, partition 1204 is not further split. Partitions 1202 and 1208 each adopt another quadtree split. For partition 1202, the second level quadtree-split top-left, top-right, bottom-left, and bottom-right partitions adopts third level splitting of quadtree, 1104 of FIG. 11, non-splitting, and 1108 of FIG. 11, respective. Partition 1208 adopts another quadtree split, and the second level quadtree-split top-left, top-right, bottom-left, and bottom-right partitions adopts third level splitting of 1106 of FIG. 11, non-splitting, non-splitting, and 1104 of FIG. 11, respectively. Two of the subpartitions of the third-level top-left partition of 1208 are further split according to 1104 and 1108. Partition 1206 adopts a second level split pattern following 1102 of FIG. 11 into two partitions which are further split in a third-level according to 1108 and 1102 of the FIG. 11. A fourth level splitting is further applied to one of them according to 1104 of FIG. 11.

For the specific example above, the maximum luma transform size may be 64×64 and the maximum supported chroma transform size could be different from the luma at, e.g., 32×32. When the width or height of the luma coding block or chroma coding block is larger than the maximum transform width or height, the luma coding block or chroma coding block may be automatically split in the horizontal and/or vertical direction to meet the transform size restriction in that direction.

In the specific example for partitioning of a base coding block into CBs above, the coding tree scheme may support the ability for the luma and chroma to have a separate block tree structure. For example, for P and B slices, the luma and chroma CTBs in one CTU may share the same coding tree structure. For I slices, for example, the luma and chroma may have separate coding block tree structures. When separate block tree modes are applied, luma CTB may be partitioned into luma CBs by one coding tree structure, and the chroma CTBs are partitioned into chroma CBs by another coding tree structure. This means that a CU in an I slice may consist of a coding block of the luma component or coding blocks of two chroma components, and a CU in a P or B slice always consists of coding blocks of all three colour components unless the video is monochrome.

Example implementations for partitioning a coding block or prediction block into transform blocks, and a coding order of the transform blocks are described in further detail below. In some example implementations, a transform partitioning may support transform blocks of multiple shapes, e.g., 1:1 (square), 1:2/2:1, and 1:4/4:1, with transform block sizes ranging from, e.g., 4×4 to 64×64. In some implementations, if the coding block is smaller than or equal to 64×64, the transform block partitioning may only apply to luma component, such that for chroma blocks, the transform block size is identical to the coding block size. Otherwise, if the coding block width or height is greater than 64, then both the luma and chroma coding blocks may be implicitly split into multiples of min (W, 64)×min (H, 64) and min (W, 32)×min (H, 32) transform blocks, respectively.

In some example implementations, for both intra and inter coded blocks, a coding block may be further partitioned into multiple transform blocks with a partitioning depth up to a predefined number of levels (e.g., 2 levels). The transform block partitioning depth and sizes may be related. An example mapping from the transform size of the current depth to the transform size of the next depth is shown in the following in Table 1.

TABLE 1

| Transform partition size setting | |
| --- | --- |
| Transform Size of Current Depth | Transform Size of Next Depth |
| TX_4X4 | TX_4X4 |
| TX_8X8 | TX_4X4 |
| TX_16X16 | TX_8X8 |
| TX_32X32 | TX_16X16 |
| TX_64X64 | TX_32X32 |
| TX_4X8 | TX_4X4 |
| TX_8X4 | TX_4X4 |
| TX_8X16 | TX_8X8 |
| TX_16X8 | TX_8X8 |
| TX_16X32 | TX_16X16 |
| TX_32X16 | TX_16X16 |
| TX_32X64 | TX_32X32 |
| TX_64X32 | TX_32X32 |
| TX_4X16 | TX_4X8 |
| TX_16X4 | TX_8X4 |
| TX_8X32 | TX_8X16 |
| TX_32X8 | TX_16X8 |
| TX_16X64 | TX_16X32 |
| TX_64X16 | TX_32X16 |

Based on the example mapping of Table 1, for 1:1 square block, the next level transform split may create four 1:1 square sub-transform blocks. Transform partition may stop, for example, at 4×4. As such, a transform size for current depth of 4×4 corresponds to the same size of 4×4 for the next depth. In the example of Table 1, for 1:2/2:1 non-square block, the next level transform split will create two 1:1 square sub-transform blocks, whereas for 1:4/4:1 non-square block, the next level transform split will create two 1:2/2:1 sub transform blocks.

In some example implementations, for luma component of an intra coded block, additional restriction may be applied. For example, for each level of transform partitioning, all the sub-transform blocks may be restricted to having equal size. For example, for a 32×16 coding block, level 1 transform split creates two 16×16 sub-transform blocks, level 2 transform split creates eight 8×8 sub-transform blocks. In other words, the second level splitting must be applied to all first level sub blocks to keep the transform units at equal sizes. An example of the transform block partitioning for intra coded square block following Table 1 is shown in FIG. 13, together with coding order illustrated by the arrows. Specifically, 1302 shows the square coding block. A first-level split into 4 equal sized transform blocks according to Table 1 is shown in 1304 with coding order indicated by the arrows. A second-level split of all of the first-level equal sized blocks into 16 equal sized transform blocks according to Table 1 is shown in 1306 with coding order indicated by the arrows.

Figure 14:
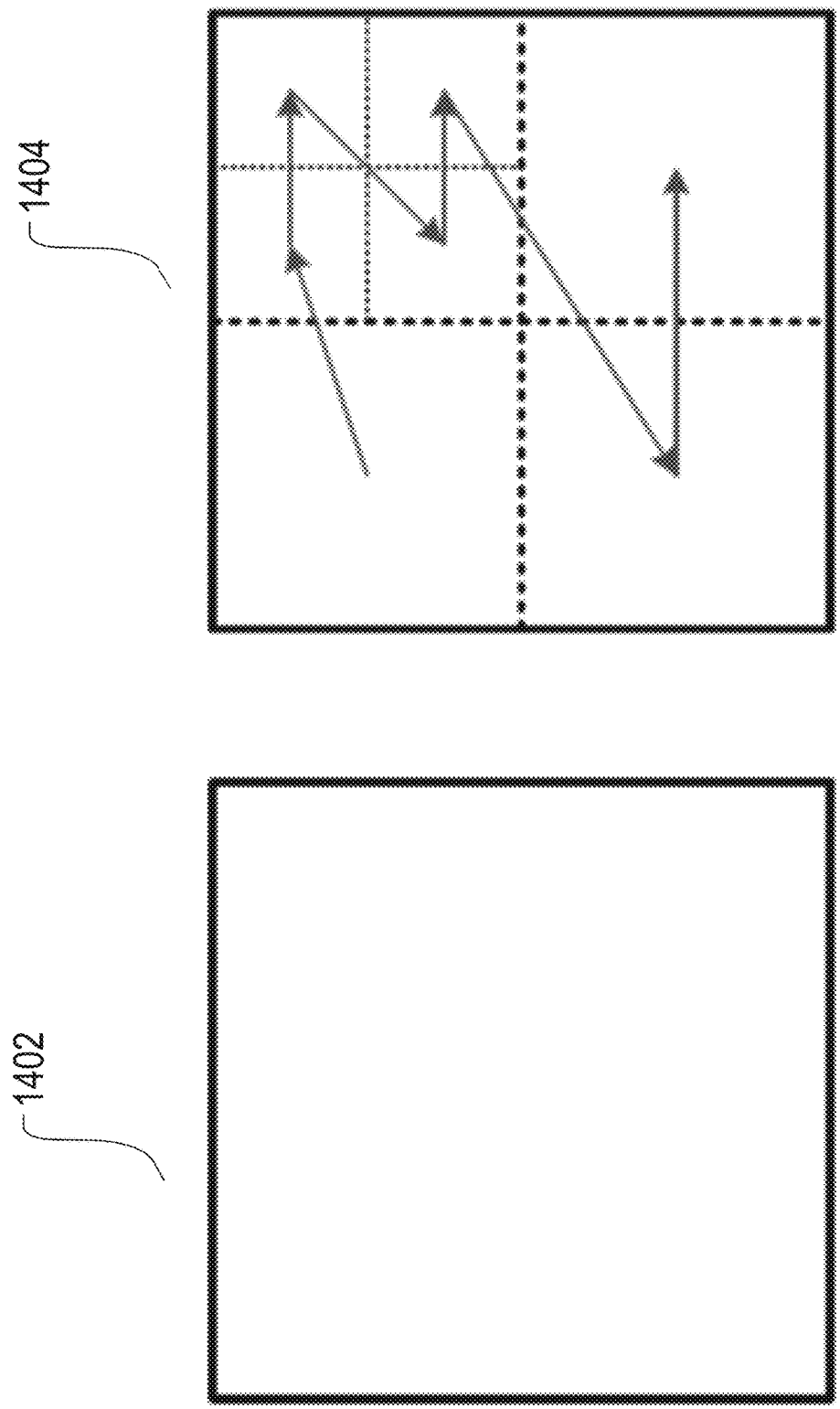
FIG. 14 shows another scheme for partitioning a coding block into multiple transform blocks and coding order of the transform block according to example embodiments of the disclosure.

In some example implementations, for luma component of inter coded block, the above restriction for intra coding may not be applied. For example, after the first level of transform splitting, any one of sub-transform block may be further split independently with one more level. The resulting transform blocks thus may or may not be of the same size. An example split of an inter coded block into transform locks with their coding order is show in FIG. 14. In the Example of FIG. 14, the inter coded block 1402 is split into transform blocks at two levels according to Table 1. At the first level, the inter coded block is split into four transform blocks of equal size. Then only one of the four transform blocks (not all of them) is further split into four sub-transform blocks, resulting in a total of 7 transform blocks having two different sizes, as shown by 1404. The example coding order of these 7 transform blocks is shown by the arrows in 1404 of FIG. 14.

In some example implementations, for chroma component(s), some additional restriction for transform blocks may apply. For example, for chroma component(s) the transform block size can be as large as the coding block size, but not smaller than a predefined size, e.g., 8×8.

In some other example implementations, for the coding block with either width (W) or height (H) being greater than 64, both the luma and chroma coding blocks may be implicitly split into multiples of min (W, 64)×min (H, 64) and min (W, 32)×min (H, 32) transform units, respectively.

Figure 15:
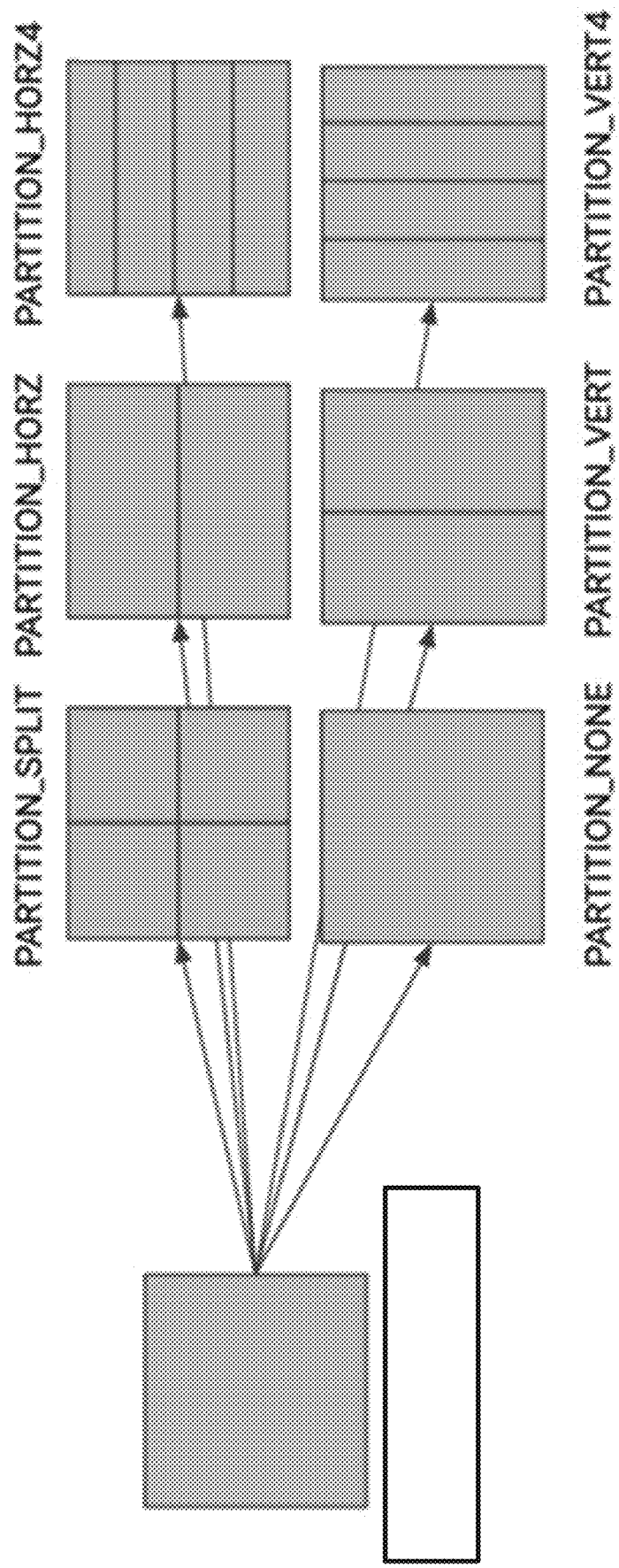
FIG. 15 shows another scheme for partitioning a coding block into multiple transform blocks according to example embodiments of the disclosure.

FIG. 15 further shows another alternative example scheme for partitioning a coding block or prediction block into transform blocks. As shown in FIG. 15, instead of using recursive transform partitioning, a predefined set of partitioning types may be applied to a coding block according a transform type of the coding block. In the particular example shown in FIG. 15, one of the 6 example partitioning types may be applied to split a coding block into various number of transform blocks. Such scheme may be applied to either a coding block or a prediction block.

In more detail, the partitioning scheme of FIG. 15 provides up to 6 partition types for any given transform type as shown in FIG. 15. In this scheme, every coding block or prediction block may be assigned a transform type based on, for example, a rate-distortion cost. In an example, the partition type assigned to the coding block or prediction block may be determined based on the transform partition type of the coding block or prediction block. A particular partition type may correspond to a transform block split size and pattern (or partition type), as shown by the 4 partition types illustrated in FIG. 15. A correspondence relationship between various transform types and the various partition types may be predefined. An example correspondence is shown below with the capitalized labels indicating the transform types that may be assigned to the coding block or prediction block based on rate distortion cost:

PARTITION_NONE: Assigns a transform size that is equal to the block size.
PARTITION_SPLIT: Assigns a transform size that is ½ the width of the block size and ½ the height of the block size.
PARTITION_HORZ: Assigns a transform size with the same width as the block size and ½ the height of the block size.
PARTITION_VERT: Assigns a transform size with ½ the width of the block size and the same height as the block size.
PARTITION_HORZ4: Assigns a transform size with the same width as the block size and ¼ the height of the block size.
PARTITION_VERT4: Assigns a transform size with ¼ the width of the block size and the same height as the block size.

In the example above, the partition types as shown in FIG. 15 all contain uniform transform sizes for the partitioned transform blocks. This is a mere example rather than a limitation. In some other implementations, mixed transform blocks sizes may be used for the partitioned transform blocks in a particular partition type (or pattern).

Figure 1A:
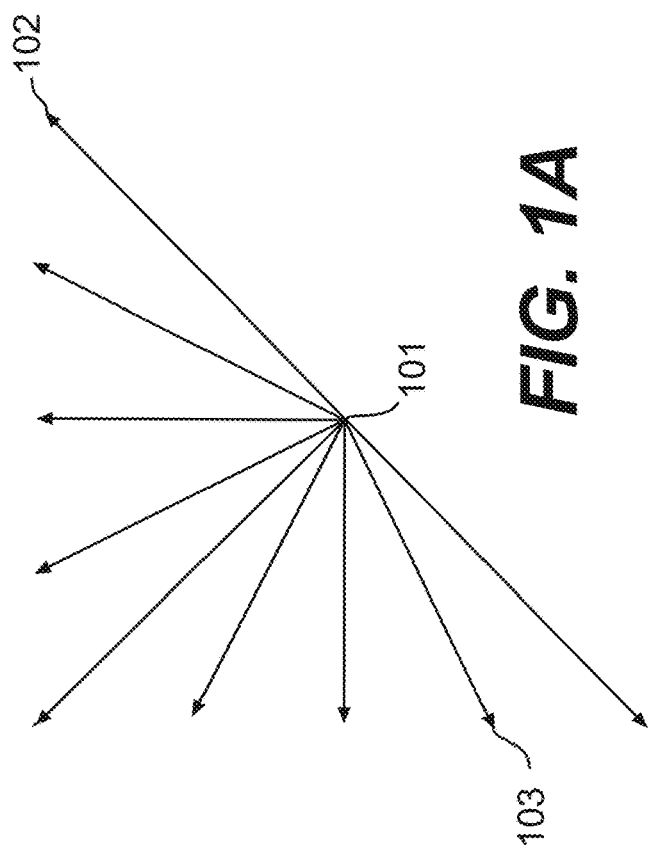
FIG. 1A shows a schematic illustration of an exemplary subset of intra prediction directional modes.
Figure 1B:
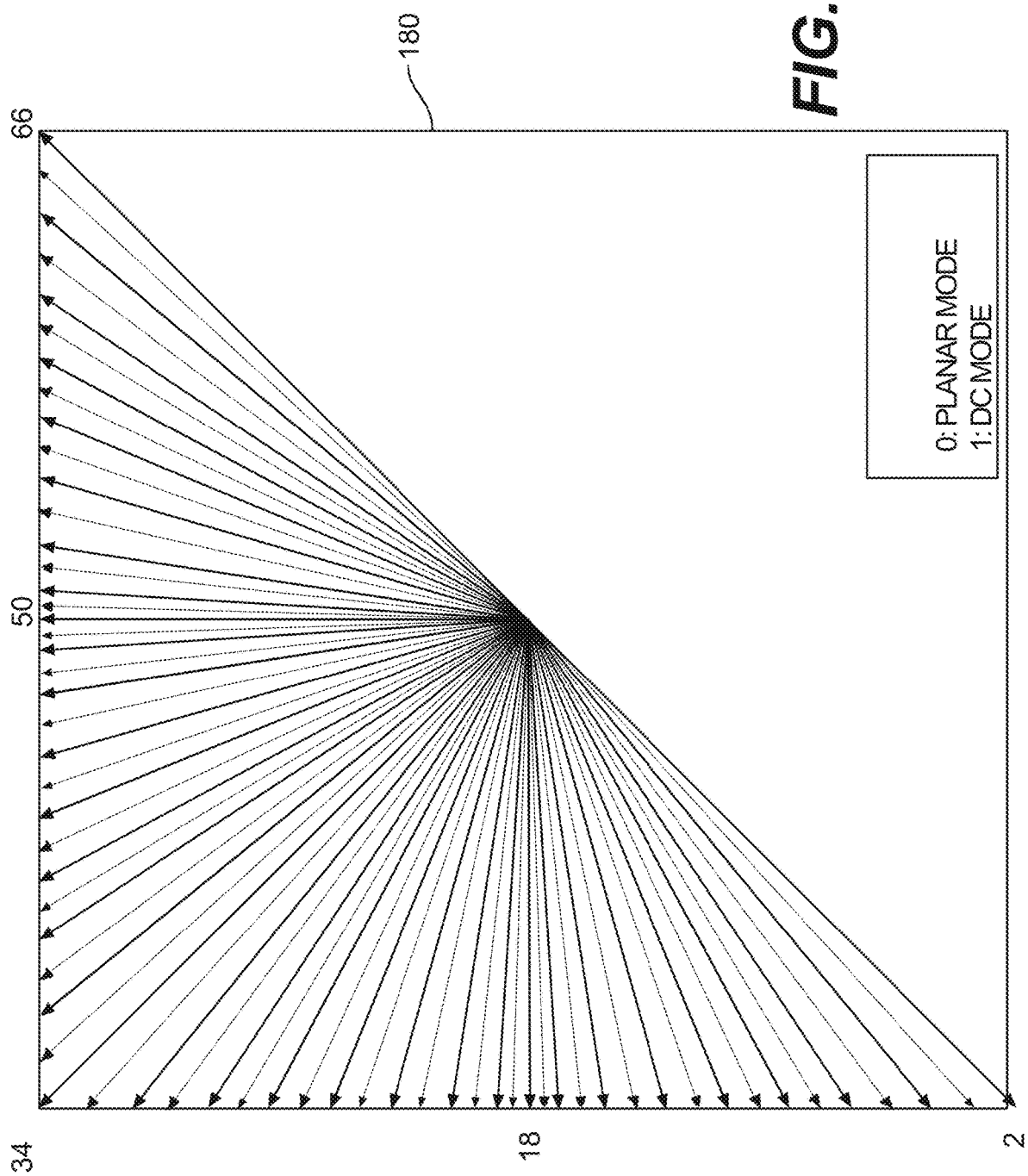
FIG. 1B shows an illustration of exemplary intra prediction directions.
Figure 2:
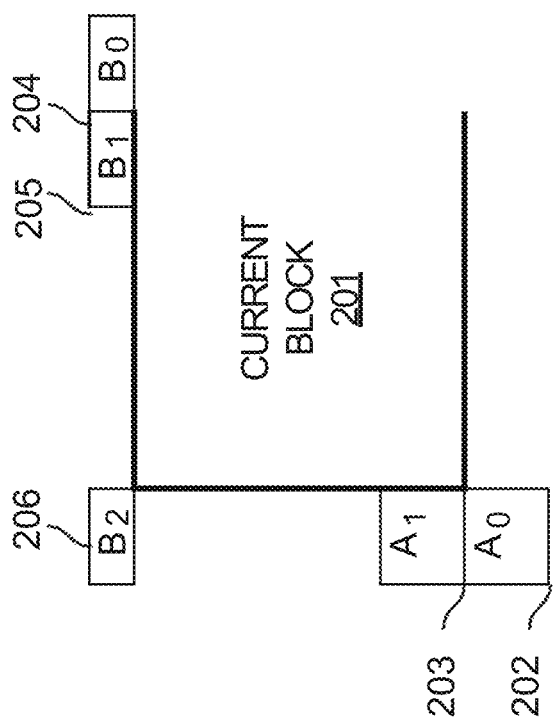
FIG. 2 shows a schematic illustration of a current block and its surrounding spatial merge candidates for motion vector prediction in one example.

Turning back to intra prediction, in some example implementations, prediction of samples in a coding block or prediction block may be based on one of a set of reference lines. In other words, rather than always using a nearest neighboring line (e.g., the immediate top neighboring line or the immediate left neighboring line of the prediction block as illustrated in FIG. 1 above), multiple reference lines may be provided as options for selection for intra prediction. Such intra prediction implementations may be referred to as Multiple Reference Line Selection (MRLS). In these implementations, an encoder decides and signals which reference line of a plurality of reference lines is used to generate the intra predictor. At the decoder side, after parsing the reference line index, the intra prediction of current intra-prediction block can be generated by identifying the reconstructed reference samples by looking up the specified reference line according to the intra prediction mode (such the directional, non-directional, and other intra-prediction modes). In some implementations, a reference line index may be signaled in the coding block level and only one of the multiple reference lines may be selected and used for intra prediction of one coding block. In some examples, more than one reference lines may be selected together for intra-prediction. For example, the more than one reference lines may be combined, averaged, interpolated or in any other manner, with or without weight, to generate the prediction. In some example implementations, MRLS may only be applied to luma component and may not be applied to chroma component(s).

Figure 16:
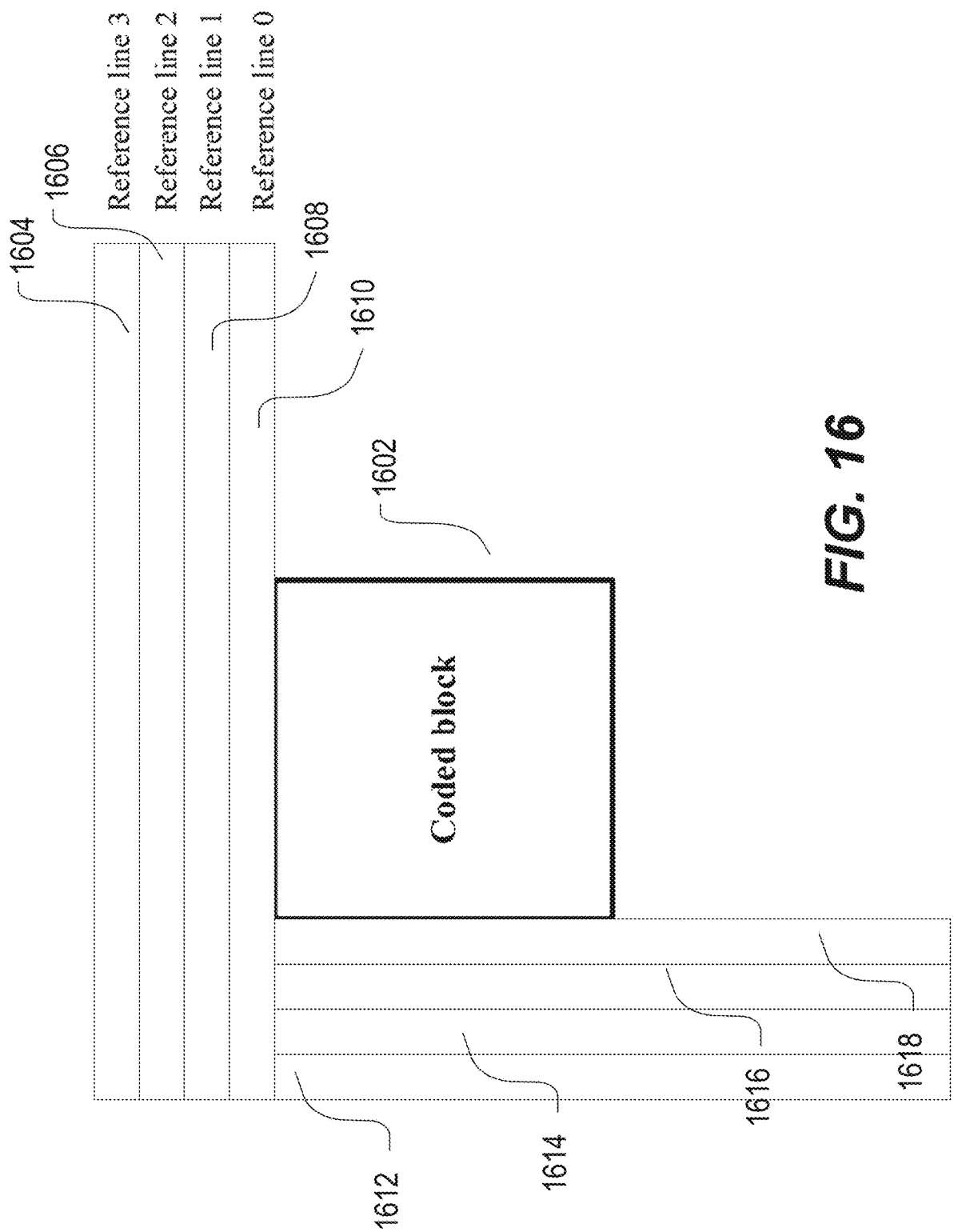
FIG. 16 shows an intra prediction scheme based on various reference lines according to example embodiments of the disclosure.

In FIG. 16, an example of 4 reference-line MRLS is depicted. As shown in the example of FIG. 16, the intra-coding block 1602 may be predicted based on one of the 4 horizontal reference lines 1604, 1606, 1608, and 1610 and 4 vertical reference lines 1612, 1614, 1616, and 1618. Among these reference lines, 1610 and 1618 are the immediate neighboring reference lines. The reference lines may be indexed according to their distance from the coding block. For example, reference lines 1610 and 1618 may be referred to as zero reference line whereas the other reference lines may be referred to as non-zero reference lines. Specifically, reference lines 1608 and 1616 may be reference as $1^{st}$ reference lines; reference lines 1606 and 1614 may be reference as $2^{nd}$ reference lines; and reference lines 1604 and 1612 may be reference as $3^{rd}$ reference lines Turning to primary transform, an example 2-D transform process may involve a use of hybrid transform kernels (which, for example, may be composed of different 1-D transforms for each dimension of the coded residual block). Example primary 1-D transform kernels may include but are not limited to a) 4-point (4p), 8-point (8p), 16-point (16p), 32-point (32p) & 64-point (64p) DCT-2; b) 4-point, 8-point, 16-point asymmetric DST's and their flipped versions; c) 4-point, 8-point, 16-point or 32-point identity transforms. The 2-D transform process may thus involve the use of hybrid transforms (different transforms for each dimension of the coded residual block), where the selection of transform to be used for each dimension may be based on a rate-distortion (RD) criterion. For example, the basis functions for the 1-D DCT-2, DST-4 & DST-7 that may be implemented as hybrid for 2-D transform are listed in Table 2.

TABLE 2

Example primary transform basis functions (DCT-2, DST-4 and DST-7 for N-point input)

| Transform Type | Basis function $T_i(j)$, i, j = 0, 1, ..., N − 1 |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$ |

TABLE 2-continued

Example primary transform basis functions (DCT-2, DST-4 and DST-7 for N-point input)

| Transform Type | Basis function $T_i(j)$, i, j = 0, 1, ..., N − 1 |
|---|---|
| | where $\omega_0 = \begin{cases} \sqrt{\frac{2}{N}} & i = 0 \\ 1 & i \neq 0 \end{cases}$ |
| DST-4 | $T_i(j) = \sqrt{\frac{2}{N}} \cdot \sin\left(\frac{\pi \cdot (2i+1) \cdot (2j+1)}{4N}\right)$ |
| DST-7 | $T_i(j) = \sqrt{\frac{4}{2N+1}} \cdot \sin\left(\frac{\pi \cdot (2i+1) \cdot (j+1)}{2N+1}\right)$ |

Figure 17:
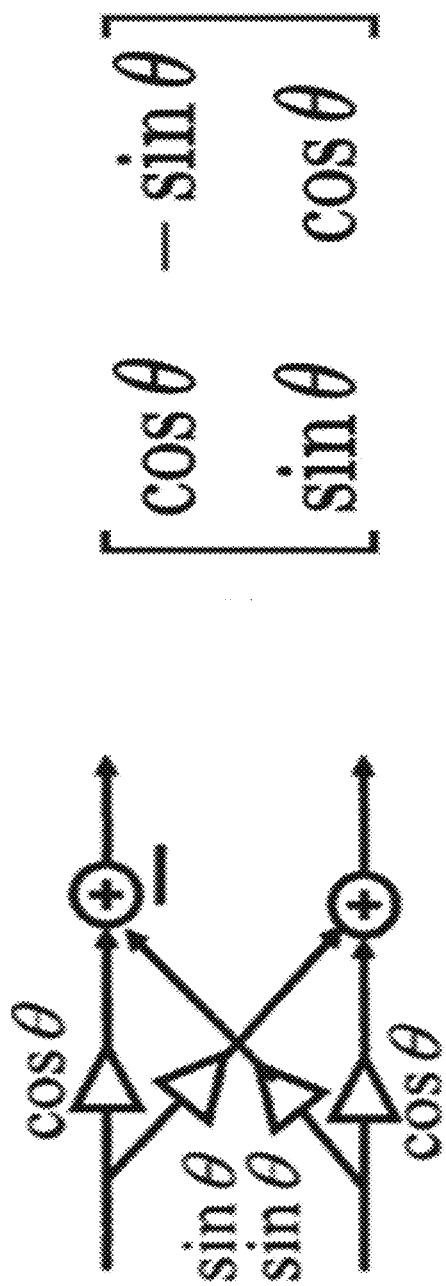
FIG. 17 illustrates a planar rotation transform according to example embodiments of the disclosure.

For example, the DCT-2 (4p-64p), DST-4 (8p, 16p), and DST-7 (4p) transforms show symmetry/anti-symmetry characteristics, thus a "partial butterfly" implementation may be supported in some example implementations to reduce a number of operation counts (multiplications, adds/subs, shifts). The partial butterfly implementation may involve planar rotations using trigonometric cosine and sine functions, as described in FIG. 17, at various angles. Example 12-bit look up tables are shown in FIG. 18 and FIG. 19, and may be utilized for generating the values of the trigonometric functions.

Figure 20:
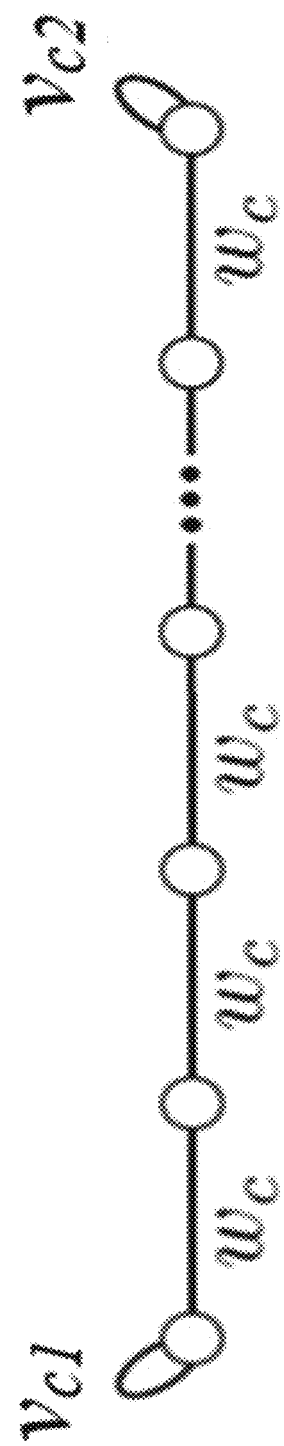
FIG. 20 shows a line graph transform according to example embodiments of the disclosure.

In some example implementations, line graph transforms (LGT) may be used in place of the 1-D DSTs above. In essence, and as shown in FIG. 20, graphs are generic mathematical structures consisting of sets of vertices and edges, which may be used for modelling affinity relations between the objects of interest. In practice, weighted graphs (for which a set of weights are assigned to edges and potentially to vertices) provide sparse representations for robust modeling of signals/data. LGTs can improve coding efficiency by providing a better adaptation for diverse block statistics. Separable LGTs may be designed and optimized by learning line graphs (as shown in the example of FIG. 20, characterized by self-loop weights $v_{c1}$, $v_{c2}$ and edge weights $w_c$) from training data to model underlying row and column-wise statistics of blocks residual signals, where the associated generalized graph Laplacian (GGL) matrices are used to derive LGTs.

Given a weighted graph G (W, V) the GGL matrix is defined as:

$$L_c = D - W + V \quad (1)$$

where W is the adjacency matrix consisting of non-negative edge weights $w_c$, D is the diagonal degree matrix, and V is the diagonal matrix denoting weighted self-loops $v_{c1}$, $v_{c2}$. The matrix $L_c$ can be represented as:

$$L_c = \begin{bmatrix} w_c + v_{c1} & -w_c & & 0 \\ -w_c & 2w_c & -w_c & \\ & \ddots & \ddots & \ddots \\ & & -w_c & 2w_c & -w_c \\ 0 & & & -w_c & w_c + v_{c2} \end{bmatrix} \text{ for } w_c > 0. \quad (2)$$

The LGTs can then be derived by the eigen-decomposition of the GGL $L_c$.

$$L_c = U\Phi U^T \quad (3)$$

where columns of orthogonal matrix U are the basis vectors of the LGT, and is the diagonal eigenvalue matrix. In fact, DCTs and DSTs, including DCT-2, DCT-8 and DST-7, are LGTs derived from certain forms of GGLs:

$$DCT\text{-}2 \text{ is derived by setting } v_{c1}=0 \quad (4)$$

$$DST\text{-}7 \text{ is derived by setting } v_{c1}=w_c \quad (5)$$

$$DCT\text{-}8 \text{ is derived by setting } v_{c2}=w_c \quad (6)$$

$$DST\text{-}4 \text{ is derived by setting } v_{c1}=2w_c \quad (7)$$

$$DCT\text{-}4 \text{ is derived by setting } v_{c2}=2w_c \quad (8)$$

In some example implementations, the LGTs can be implemented as matrix multiplications. The 4p LGT core may be derived by setting $v_{c1}=2w_c$ in $L_c$, which means that it is a DST-4. The 8p LGT core may be derived by setting $v_{c1}=1.5w_c$ in $L_c$, and the 16p and 32p LGT core may be derived by setting $v_{c1}=w_c$ in $L_c$, which means that it is a DST-7.

In some implementation, secondary transform on the primary transform coefficients may be performed. Secondary transform may be applied between forward primary transform and quantization (at encoder) and between de-quantization and inverse primary transform (at decoder side). In some specific example implementations, predefined sets (e.g., 12 sets) of secondary transforms, with a pre-defined number (e.g., 3) of kernels in each set.

In some example implementations, a secondary transform kernel set may correspond to a particular intra-prediction mode. As an example, FIG. 21 describes indices used for secondary transform kernel set selection based on intra-prediction modes. In FIG. 21, the first row indicates the intra-prediction modes for which secondary transform is allowed and thus correspond to some available transform kernels, and the second row indicates the set indices of corresponding secondary transform sets. At the encoder, for each intra-prediction mode, the best kernel from the multiple (e.g., 3) transform kernels from the set may be selected based on RDO (Rate Distortion Optimization), and the selection may be signaled (e.g., 4 symbols, including no IST (intra secondary transform)). At the decoder, the bitstream may be parsed to obtain the kernel used for inverse transform for decoding based on intra-prediction mode and the signaled index within the kernel set corresponding to the intra-prediction mode.

In some example implementations, as a result of an observation that DCT type 2 (DCT-2) and ADST are the most frequently selected primary transform types for intra coding, and in order to achieve higher coding efficiency, intra secondary transform (IST) may be selectively enabled when either DCT-2 or ADST is used as both horizontal and vertical primary transform, and may not be enabled under other primary transform usage.

In some example implementations, the IST may be enabled only for luma intra blocks and may be disabled for chroma intra blocks. In an example, based on the block size, either a 4×4 non-separable transform or an 8×8 non-separable transform may be selected. In an example, if min (tx_width, tx_height)<8, the 4×4 IST non-seperable may be selected. For larger blocks with both tx_width and tx_height being greater than or equal to 8, the 8×8 non-separable IST may be used. Here tx_width & tx_height correspond to transform block width and height, respectively.

In some example implementations, the input to the IST may be a linearized vector of low frequency primary transform coefficients in a zig-zag scan order. This helps to achieve more efficient decorrelation of neighboring low frequency coefficients in the secondary transform.

In some example implementations, as descried above, both intra and inter coded blocks may be further partitioned into multiple transform blocks with the partitioning depth up to a predefined number of levels (e.g., 2 levels), thereby forming a transform partitioning tree structure, as described above. In some particular implementations, application of the IST may be limited to the root (depth 0) of the transform partitioning tree structure, or limited to levels lower than the maximum applied transform unit partitioning level. A decrease in the overall encoding time complexity (e.g., ~50%) with minimal impact in compression efficiency (e.g., ~0.25% loss) may be achieved by this applying this limitation.

In some example implementations, square transform block size may be utilized to derive context information, and thereby the contexts, to be used for entropy coding the kernel index. For rectangular transform blocks, the next smallest square size may be utilized to derive context information.

As described above, determination of coding parameters and configuration for intra prediction and transform of residuals of intra-predicted blocks is a complex, resource-heavy, and time-consuming process. When MRLS, multiple transform partition types, multiple transform types, and multiple intra secondary transforms (different sets and each containing multiple secondary transform kernels) may be all enabled in intra coded blocks to improve coding efficiency and quality, the encoder needs to search a large parameter space and all possible combinations of the above factors in order to find the best coding configuration, transform kernels, and other parameters for each prediction or coding block, which significantly increases the computational complexity, memory requirement, and encoding time. Moreover, the large parameter space may also result in significant signaling overhead.

In various example implementations below, such a parameter space and possible combinations may be conditionally reduced while keeping coding efficiency and coding quality degradation minimal. Thus, on average (over various coding blocks), an encoder would search a smaller parameter space and fewer number of potential combinations of the various factors above to identify near-optimal coding scheme for the input coding blocks or prediction blocks. In particular, the shrinkage of the parameter space may be conditioned on whether a zero reference line or a non-zero reference line is used for intra prediction for a particular coding or prediction block. The optimization search space may be significantly reduced when non-zero reference line is used. The coding configuration and parameter to be optimized may include but are not limited to selection of optimal primary and/or secondary transform kernels. The reduction of parameter space may also lead to corresponding reduction of the amount of information need to be signalled, thereby reducing signalling overhead in the coded bit stream.

These example implementations may be used separately or combined in any order or in any manner. In the discourse above and below, the terms "coded block", "coding bock", and the like may be used to refer to a picture unit that prediction or transform is performed. A coding block may be a luma coding block or may be a chroma coding block. In some situations, coded/coding block may refer to a prediction block. The term "block size" is used to refer to either the width or height, or maximum value of width and height, or minimum of width and height, or area size (width*height), or aspect ratio (width:height, or height:width) of the coding block. In the following disclosure, an adjacent (or nearest, or zero) reference line for intra-prediction purposes refers to a reference line with index equal to 0, and a non-adjacent or non-zero reference line refers to a reference line with index greater than 0.

In the disclosure below, signaling of transform block size, as the term is used, may also refers to signaling of transform block splitting structure, scheme, pattern, and the like. In this disclosure, the extended set of hybrid transform kernels for primary transform may be referred to as transform set A. Set A, for example, may exhaustively include collection of all combinations of 1-D DCT type 1 to 8, DST type 1 to 8 (ADST), IDT (identity in any direction), LGT, KLT, and the like. These 1-D transform may be applied in any combination along two directions for a 2D-transform as a hybrid transform.

In a general example implementation, a reduced set rather than a full set of primary transform kernels and/or secondary transform kernels may be used when a non-zero reference line is applied for a intra coded block. As such, when an encoder needs to determine which primary or secondary transform kernel to use for a particular coding block or a portion of the coding block, it may only need to search the reduced set rather than the full set during an optimization process (e.g., a rate distortion optimization process). The determination of whether a zero or nonzero reference line should be used for a particular coding block may be made in any manner. For example, it may be made separately by the encoder based on characteristics of the current coding block and its neighboring blocks.

In some example implementations, only a subset of primary transformation kernel from the full primary transformation kernel set A can be used as candidate primary kernels during the search and optimization process when non-zero reference lines are applied to a intra coded block. The subset of primary transformation kernels may be predefined based on offline statistical studies indicating some particular subsets of primary transformation kernels that generally are most likely be optimal when non-zero reference line is used for intra prediction. For example, it may be observed that when non-zero reference line is used, DCT type 2 and ADST hybrid kernel types are likely to be optimal primary kernel type in most practical cases.

The general implementations above may be applied to reduction of candidate primary transform kernels for intra prediction when non-zero reference line is used. In some particular example implementations, when non-zero reference line is used, the subset of primary transform kernels allowed for intra prediction may be limited to a combination of 1-D DCT type 2 and 1-D ADST as the hybrid 2-D transform kernel.

In some other particular example implementations, when non-zero reference line is used, the subset of primary transform kernels allowed for intra prediction may be limited to a combination of 1-D DCT type 2, 1-D ADST and 1-D flipped ADST as the hybrid 2-D transform kernel.

In some other particular example implementation, when non-zero reference line is used, the subset of primary transform kernels allowed for intra prediction may be limited to a combination of 1-D DCT type 2 and 1-D IDT as the hybrid 2-D transform kernel.

In yet some other particular example implementations, when non-zero reference line is used, the subset of primary transform kernels allowed for intra prediction may be limited to a combination of 1-D DCT type 2, 1-D ADST, 1-D flipped ADST and 1-D IDT as the hybrid 2-D transform kernel.

In some example implementations, whether the reduction of candidate primary or secondary transform kernels may be applied for intra prediction when non-zero reference line is used may further depends on whether a prediction or coding block is to be divided into multiple transform blocks. The underlying idea is that if the current prediction or coding block is to be divided into multiple transform blocks, that means the selection of primary and/or secondary transform kernels may need to be optimized for each of the transform blocks separately rather than for the entire prediction or coding block as a whole, and reducing the number of candidate primary and/or secondary kernels for intra prediction involving non-zero reference line from those for intra prediction involving zero reference line would result in less optimization burden with minimal degradation of coding efficiency and quality for the encoder.

Such reduction may be applied to the selection of secondary transform kernels. Thus, in some particular example implementations, when there are multiple transform blocks or inside a coding or prediction block, the allowed secondary transform set for a transform block when non-zero reference lines is applied may be reduced to a subset of the allowed secondary transform set when zero reference line is applied. In one embodiment, such implementations may be particularly applied when secondary transform kernel selection is to be performed and the selection information is to be signaled for each transform block (rather than at the entire prediction block or coding block level).

In some example implementations, the reduction of candidate secondary transform kernel set may be tiered by the use of non-zero line and the division into transform blocks. For example, when non-zero line is used for intra prediction and the coding block or prediction block is not further split into more than one transform units, a first reduced set of secondary transform kernels from the full secondary transform kernel set for zero reference line intra prediction may be used as optimization candidates. However, when non-zero line is used for intra prediction and the coding block or prediction block is further split into more than one transform blocks, a second reduced set of secondary transform kernels from the full secondary transform kernel set for zero reference line intra prediction may be used as optimization candidates. The second reduced set of secondary transform kernels, for example, may be a subset of the first reduced set of secondary transform kernels. In other words, when non-zero reference line is used for intra prediction, the candidate secondary transform kernel set is reduced from the full set of secondary transform kernel, and if the coding block or prediction block is further subdivided into more than one transform blocks, then that reduced set of secondary transform kernels may be further reduced.

In some example implementations, when there are multiple transform blocks inside a coding or prediction block, secondary transform may not be allowed at all for a transform block when non-zero reference lines are used for intra prediction of current block. In other words, the encoder may go to an extreme of reducing the set of secondary transform kernel to a NULL set when non-zero reference line is used for intra prediction and when coding block or prediction block is to be further subdivided in to more than one transform blocks.

In some other example implementations, likewise, the reduction of candidate transform kernels for intra prediction depending on whether a prediction or coding block is to be divided into multiple transform blocks when non-zero reference line is used may be applied to primary transform. For example, when there are multiple transform blocks inside a coding or prediction block, the allowed primary transform type set for a transform block when non-zero reference lines is applied may be a subset of the allowed primary transform set (e.g. hybrid transform set) when zero reference line is applied. In one embodiment, such implementations may be particularly applied when primary transform selection is to be performed and the selection information is to be signaled for each transform block or transform unit (rather than at the entire prediction block or coding block level).

In some example implementations, the reduction of candidate primary transform kernel set may be tiered. For example, when non-zero line is used for intra prediction and the coding block or prediction block is not further split into more than one transform blocks, a first reduced set of primary transform kernels from the full primary transform kernel set for zero reference line intra prediction (set A above) may be used as optimization candidates. However, when non-zero line is used for intra prediction and the coding block or prediction block is further split into more than one transform blocks, a second reduced set of secondary transform kernels from the full primary transform set for zero reference line intra prediction (set A above) may be used as optimization candidates. The second reduced set of primary transform kernels, for example, may be a subset of the first reduced set of primary transform kernels. In other words, when non-zero reference line is used for intra prediction, the candidate primary transform kernel set is reduced from the full set (set A above), and if the coding block or prediction block is further subdivided into more than one transform blocks, then that reduced set of primary transform kernels may be further reduced.

In another embodiment, when there are multiple transform blocks inside a coding or prediction block, primary transform selection may not be signaled for a transform block when non-zero reference lines are used for intra prediction of current block. In other words, the subset of primary transform kernel in that situation may be reduced to the extent that the selection of primary transform kernel is predefined and need not be signaled.

In some example implementations, when multiple reference lines may be used in intra prediction, the reference line index selected for intra-coding for a coding block or other coding units may be used to derive the context (or CDF) for entropy coding of the primary transform or secondary transform index. Because the reference line index may be correlated with the primary transform or secondary transform index, such implementations may help achieving higher entropy coding efficiency of these indices in the coded bitstream.

In some further implementations, if current coded block has multiple transform blocks and a reference line index indicates that a non-zero reference line is used for current coded block or prediction block, then reduction of the primary transforms and secondary transforms kernel sets may only be applied to some rather than all of the transform blocks. For example, when current coded block has multiple transform blocks and a reference line index indicates that a non-zero reference line is used, the reduced subsets of primary and/or secondary transform kernels may only be used for the transform block(s) towards the top or left boundary of current coded or prediction block, whereas all the primary transforms and secondary transforms can be used as candidates for the transform block(s) located at the remaining places of current coded block or prediction block.

Figure 22:
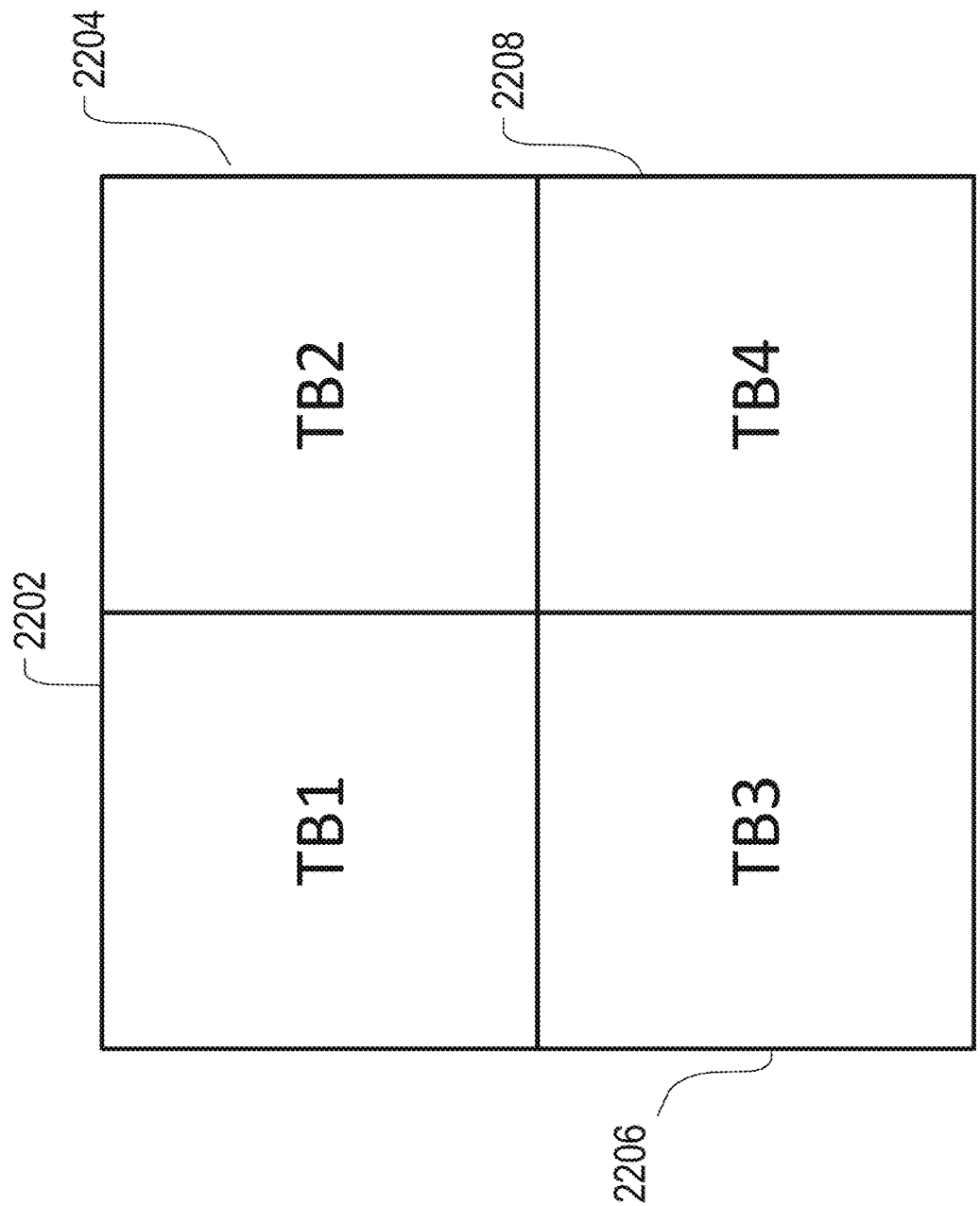
FIG. 22 shows coding block with 4 transform blocks according to example embodiments of the disclosure

This is illustrated in FIG. 22. In the example of FIG. 22, there are 4 transform blocks in one coded block, labeled as TB1 TB4 and represented by 2202-2208 in FIG. 22. TB1, TB2, and TB3 are located at the top or left boundary of current coded block. TB1-TB3 may be processed by selecting from reduced candidate primary and/or secondary transform kernel sets whereas TB4 may be processed by selecting from full candidate primary and/or secondary transform kernel sets.

Independent of, separate from, or in combination or conjunction of the various example implementations above, in some further example implementations, a selected subset of transform partition types rather than a full set of candidate transform partition types may be used when a non-zero reference line is applied for a intra coded block. As described above in relation to the example of FIG. 15, a coding block or prediction block may be assigned with a transform partition type among a set of predefined transform partition types based on a transform type of the coding or prediction block determined based on, for example, rate-distortion cost. Such transform partition types would correspond to various different pre-defined transform block partition patterns. These example implementations would further reduce the candidate partitioning patterns to select from for an intra coding block or prediction block when non-zero reference line is used. As such, optimization search space for optimal partition pattern into transform blocks for the encoder may be reduced. Further, the reduced set of transform partition types may correspond to patterns with smaller number of transform block partitions, which help reduce the amount of optimizations when coding or transform configurations and parameters for each transform unit need to be separately optimized.

For example, in one embodiment, the subset of transform partition types may include only PARTITION_NONE of FIG. 15, which indicates that transform block size is the same as the prediction/coding block size. In other words, no partitioning into transform blocks is to be performed.

For another example, in one embodiment, the subset of transform partition types may include only transform partition types with number of transform sub-partitions less than or equal to a given threshold value. Example threshold values may include but is not limited to 1, 2, 3, 4, 5, 6, . . . , 16. For example, the threshold may be 2 with respect to FIG. 15, and with such a threshold, the subset of transform partition types may include PARTITION_NONE, PARTITION_HORZ, and PARTITION_VERT only.

In some further example implementations, the index of the reference line used in the above example implementations may be considered with respect to the reduced sets of candidate primary and/or secondary transform kernels and/or the subset of transform partitioning types. In other words, items included in the various subsets may be dependent on how far away is the non-zero reference being used from the current coding block or prediction block. For example, for zero reference line, full sets may be used whereas subsets may be used for non-zero reference lines (as described in the implementations above), and the subsets may further reduce as the non-zero reference line index increases.

For example, generally, when different reference lines are applied, different primary and/or secondary transform kernel sets can be applied and/or signaled for a transform block.

In one further embodiment, for different nonzero reference lines, the primary and/or secondary transform kernel candidates and/or transform partition candidate types are the same sets. In other words, no-differentiation may be made between nonzero reference lines of different line index.

In another further embodiment, for different nonzero reference lines, the primary and/or secondary transform kernel candidates and/or transform partition candidate types are different sets.

The various subsets of primary transform kernels, secondary transform kernels, and transform partition types may be predefined with respect to various reference line configuration for intra prediction. Thus, these subsets may not need to be signaled. Indices into these subsets, as determined and selected by the encoder, may be signaled. Such indices may be correlated and thus may be jointly signaled and used as jointly to derive context for entropy coding.

Figure 23:
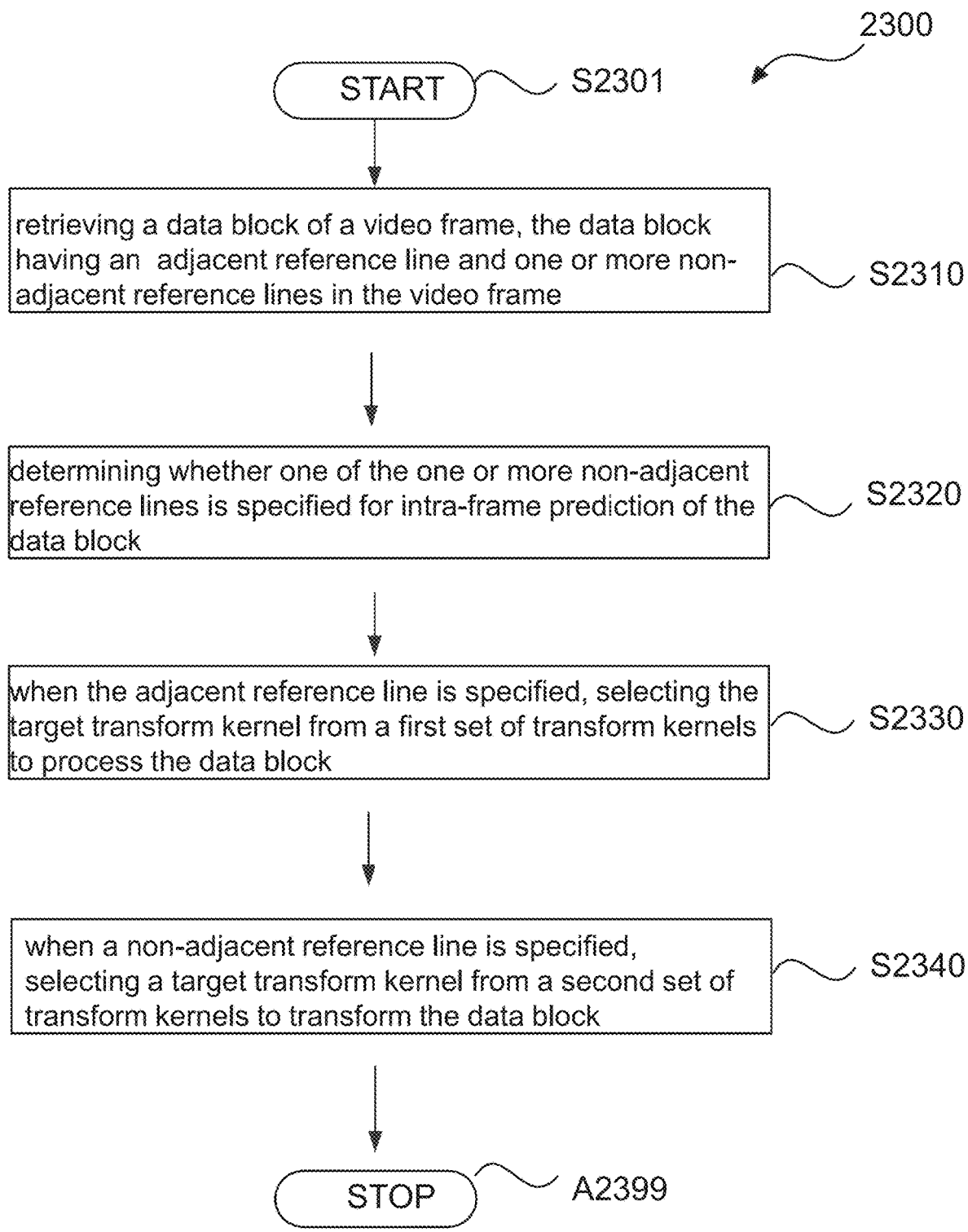
FIGS. 23-25 show flow charts of methods according to example embodiments of the disclosure.

FIG. 23 shows a flow chart 2300 of an example method following the principles underlying the implementations above. The example method flow 2300 starts at 2301. In S2310, a data block of a video frame is retrieved. The data block may include an adjacent reference line and one or more non-adjacent reference lines in the video frame. In S2320, it is determined whether one of the one or more non-adjacent reference lines is to be used for intra prediction of the data block. In S2330, when an adjacent reference line is used for the intra prediction of the data block, a target transform kernel may be selected from a first set of transform kernels to transform the data block. In S2340, when a non-adjacent reference line is used for the intra prediction of the data block, the target transform kernel may be selected from a second set of transform kernels to transform the data block. The example method flow 2300 ends at S2399.

Figure 24:
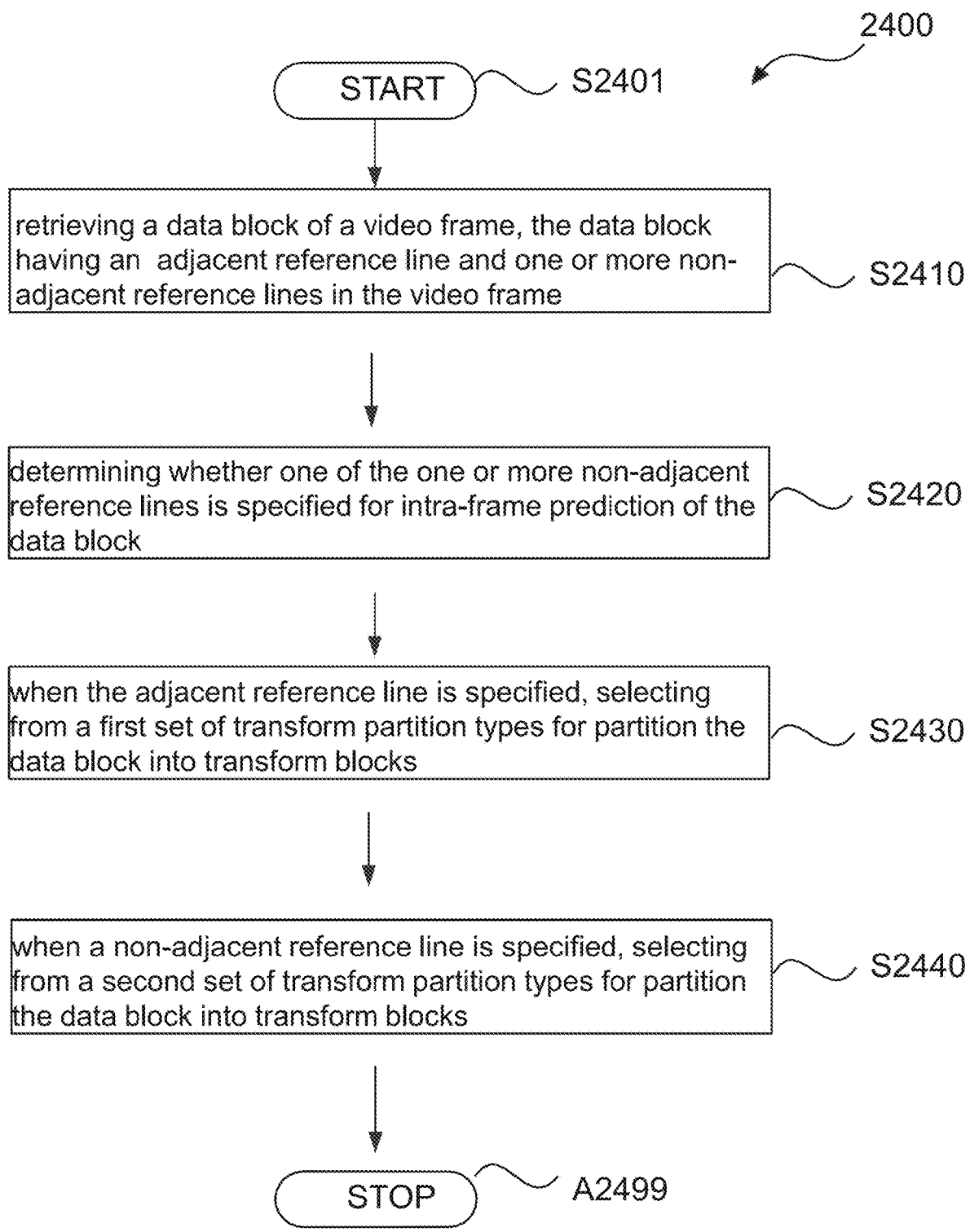

FIG. 24 shows a flow chart 2400 of another example method following the principles underlying the implementations above. The example method flow 2400 starts at 2401. In S2410, a data block of a video frame is retrieved. The data block may include an adjacent reference line and one or more non-adjacent reference lines in the video frame. In S2420, it is determined whether one of the one or more non-adjacent reference lines is to be used for intra prediction of the data block. In S2430, when an adjacent reference line is used for the intra prediction of the data block, a first set of transform partition types may be selected for partition the data block into transform partition blocks. In S2440, when a non-adjacent reference line is used for the intra prediction of the data block, a second set of transform partition types may be selected for partition the data block into transform partition blocks. The example method flow 2400 ends at S2499.

Figure 25:
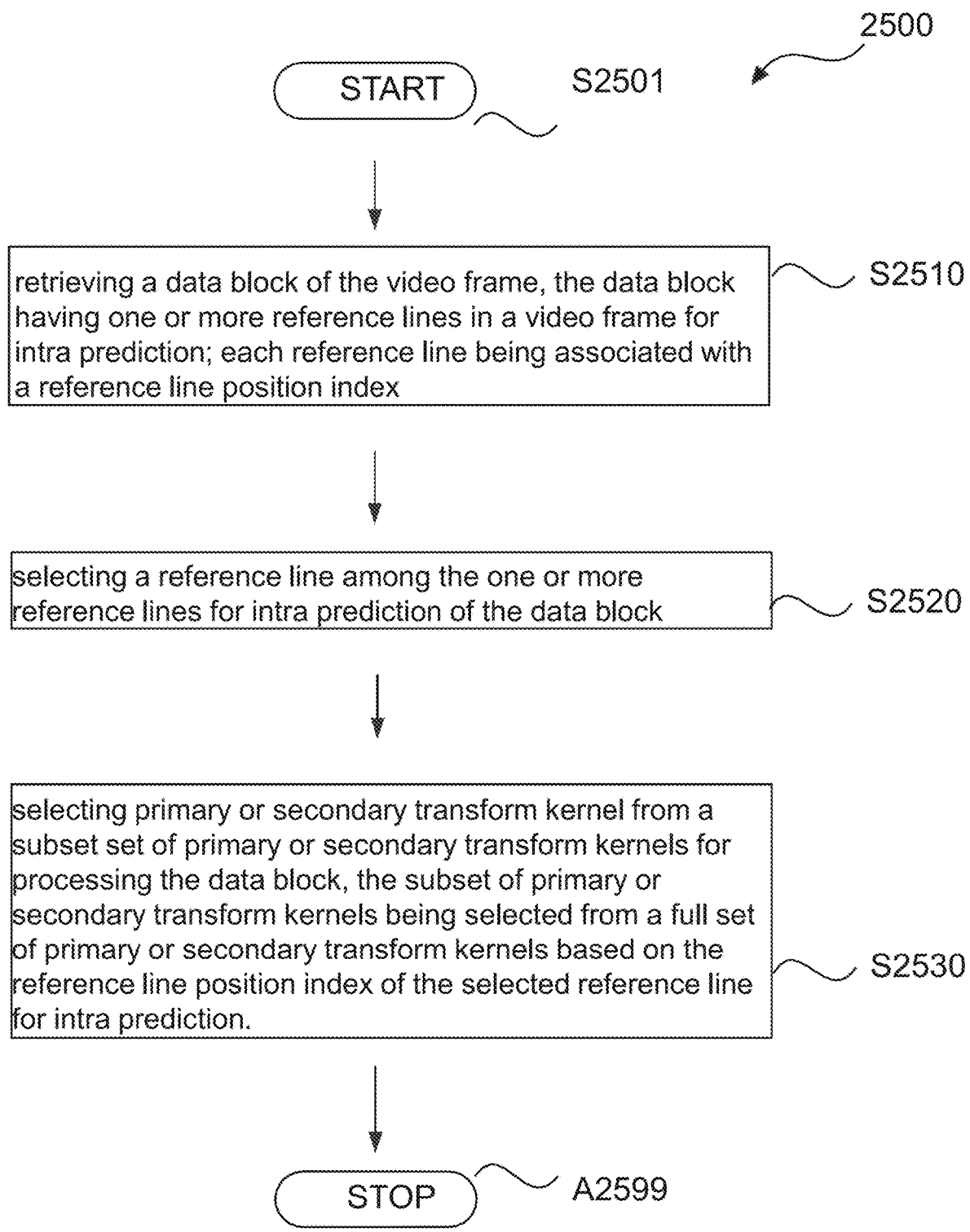

FIG. 25 shows a flow chart 2500 of yet another example method following the principles underlying the implementations above. The example method flow 2500 starts at 2501. In S2510, a data block of a video frame is retrieved. The data block may include one or more reference lines in the video frame for intra prediction, each reference line being associated with a reference line position index. In S2520, a reference line is selected among the one or more reference lines for intra prediction of the data block. In S2530, a primary or secondary transform kernel may be selected from a subset of primary or secondary transform kernels for processing the data block, the subset of primary or secondary transform kernels being selected from a full set of primary or secondary transform kernels based on the reference line position index of the selected reference line for intra prediction. The example method flow 2500 ends at S2599.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media. For example, FIG. 26 shows a computer system (2600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 26 for computer system (2600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2600).

Computer system (2600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2601), mouse (2602), trackpad (2603), touch screen (2610), data-glove (not shown), joystick (2605), microphone (2606), scanner (2607), camera (2608).

Computer system (2600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2610), data-glove (not shown), or joystick (2605), but there can also be tactile feedback devices that do not serve as input devices), audio output devices (such as: speakers (2609), headphones (not depicted)), visual output devices (such as screens (2610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2600) can also include human accessible storage devices and their associated media such as optical media including CD/DVD ROM/RW (2620) with CD/DVD or the like media (2621), thumb-drive (2622), removable hard drive or solid state drive (2623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2600) can also include an interface (2654) to one or more communication networks (2655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (2649) (such as, for example USB ports of the computer system (2600)); others are commonly integrated into the core of the computer system (2600) by attachment to a system bus as described below (for example Ethernet interface into a PC computer system or cellular network interface into a smartphone computer system). Using any of these networks, computer system (2600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2640) of the computer system (2600).

The core (2640) can include one or more Central Processing Units (CPU) (2641), Graphics Processing Units (GPU) (2642), specialized programmable processing units in the form of Field Programmable Gate Areas (FPGA) (2643), hardware accelerators for certain tasks (2644), graphics adapters (2650), and so forth. These devices, along with Read-only memory (ROM) (2645), Random-access memory (2646), internal mass storage such as internal non-user accessible hard drives, SSDs, and the like (2647), may be connected through a system bus (2648). In some computer systems, the system bus (2648) can be accessible in the form of one or more physical plugs to enable extensions by additional CPUs, GPU, and the like. The peripheral devices can be attached either directly to the core's system bus (2648), or through a peripheral bus (2649). In an example, the screen (2610) can be connected to the graphics adapter (2650). Architectures for a peripheral bus include PCI, USB, and the like.

CPUs (2641), GPUs (2642), FPGAs (2643), and accelerators (2644) can execute certain instructions that, in combination, can make up the aforementioned computer code. That computer code can be stored in ROM (2645) or RAM (2646). Transitional data can also be stored in RAM (2646), whereas permanent data can be stored for example, in the internal mass storage (2647). Fast storage and retrieve to any of the memory devices can be enabled through the use of cache memory, that can be closely associated with one or more CPU (2641), GPU (2642), mass storage (2647), ROM (2645), RAM (2646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (2600), and specifically the core (2640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2640) that are of non-transitory nature, such as core-internal mass storage (2647) or ROM (2645). The software implementing various embodiments of the present disclosure can be stored in such devices and executed by core (2640). A computer-readable medium can include one or more memory devices or chips, according to particular needs. The software can cause the core (2640) and specifically the processors therein (including CPU, GPU, FPGA, and the like) to execute particular processes or particular parts of particular processes described herein, including defining data structures stored in RAM (2646) and modifying such data structures according to the processes defined by the software. In addition or as an alternative, the computer system can provide functionality as a result of logic hardwired or otherwise embodied in a circuit (for example: accelerator (2644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
HDR: high dynamic range
SDR: standard dynamic range
JVET: Joint Video Exploration Team
MPM: most probable mode
WAIP: Wide-Angle Intra Prediction
CU: Coding Unit
PU: Prediction Unit
TU: Transform Unit
CTU: Coding Tree Unit
PDPC: Position Dependent Prediction Combination
ISP: Intra Sub-Partitions
SPS: Sequence Parameter Setting
PPS: Picture Parameter Set
APS: Adaptation Parameter Set
VPS: Video Parameter Set
DPS: Decoding Parameter Set
ALF: Adaptive Loop Filter
SAO: Sample Adaptive Offset
CC-ALF: Cross-Component Adaptive Loop Filter
CDEF: Constrained Directional Enhancement Filter
CCSO: Cross-Component Sample Offset
LSO: Local Sample Offset
LR: Loop Restoration Filter
AV1: AOMedia Video 1
AV2: AOMedia Video 2

What is claimed is:

1. A method for video decoding, the method comprising:
retrieving, from a video bitstream, a data block of a video frame;
determining whether at least one non-adjacent reference line is to be used for intra prediction of the data block;
in accordance with a determination that no non-adjacent reference line is to be used for the intra prediction of the data block, selecting a target transform kernel from a first set of transform kernels to transform the data block, wherein the first set of transform kernels has a first size; and
in accordance with a determination that at least one non-adjacent reference line is to be used for the intra prediction of the data block, selecting the target transform kernel from a second set of transform kernels to transform the data block, wherein the second set of transform kernels has a second size that is less than the first size.

2. The method of claim 1, wherein the first set of transform kernels and second set of transform kernels are primary transform kernels or secondary transform kernels.

3. The method of claim 1, wherein:
the second set of transform kernels is a subset of the first set of the transform kernels.

4. The method of claim 3, wherein:
the first set of transform kernels and second set of transform kernels are primary transform kernels; and
the second set of transform kernels comprises one of:
- a combination of DCT type 2 and ADST as a hybrid transform kernel;
- a combination of DCT type 2, ADST, and flipped ADST as the hybrid transform kernel;
- a combination of DCT type 2 and IDT as the hybrid transform kernel; or
- a combination of DCT type 2, ADST, flipped ADST, and IDT as the hybrid transform kernel.

5. The method of claim 1, wherein:
when the data block comprises two or more transform partition blocks, the second set of transform kernels is a subset of the first set of transform kernels.

6. The method of claim 5, wherein:
the data block comprises two or more transform partition blocks; and
the second set of transform kernels comprises is a NULL set.

7. The method of claim 5, wherein:
the data block comprises two or more transform partition blocks; and
selection of the target transform kernel from the first set of transform kernels or the second set of transform kernels is separately signaled for each of the two or more transform partition blocks.

8. The method of claim 5, wherein:
the data block comprises two or more transform partition blocks; and
selection from the second set of transform kernels is predefined and is not signaled in the video bitstream when a non-adjacent reference line is indicated in the video bitstream for the data block.

9. The method of claim 1, wherein a reference line index used for intra prediction of the data block is used to derive a context for entropy coding of a kernel index for a primary transform kernel for transforming a secondary transform kernel selected from the first set of transform kernels or the second set of transform kernels.

10. The method of claim 1, wherein when the data block further comprises two or more transform partition blocks:
the second set of transform kernels is a subset of the first set of transform kernels for a subset of the two or more transform partition blocks; and
the second set of transform kernels and the first set of transform kernels are the same for a remainder of the two or more transform partition blocks.

11. The method of claim 10, wherein the subset of the two or more transform partition blocks comprises upper and/or left transform partitions of the data block.

12. The method of claim 1, wherein the selection of the target transform kernel from the first set of transform kernels or the second set of transform kernels is performed when multiple transform partition types are enabled for partitioning the data block into transform blocks and both primary and secondary transform kernels are enabled for the data block.

13. The method of claim 1, further comprising:
in accordance with a determination that no non-adjacent reference line is to be used for the intra prediction of the data block, selecting a target transform partition from a first set of transform partitions for partitioning the data block into transform partition blocks, wherein the first set of transform partitions has a first size; and
in accordance with a determination that at least one non-adjacent reference line is to be used for the intra prediction of the data block, selecting the target transform kernel from a second set of transform partitions, wherein the second set of transform kernels has a second size that is less than the first size.

14. A method for encoding video, the method comprising:
receiving video data comprising a plurality of video frames, including a data block of a current video frame;
determining whether at least one non-adjacent reference line is to be used for intra prediction of the data block;
in accordance with a determination that no non-adjacent reference line is to be used for the intra prediction of the data block, selecting a target transform kernel from a first set of transform kernels for the data block, wherein the first set of transform kernels has a first size; and
in accordance with a determination that at least one non-adjacent reference line is to be used for the intra prediction of the data block, selecting the target transform kernel from a second set of transform kernels, wherein the second set of transform kernels has a second size that is less than the first size.

15. The method of claim 14, wherein the second set of transform kernels is a subset of the first set of the transform kernels.

16. The method of claim 14, wherein the selection of the target transform kernel from the first set of transform kernels or the second set of transform kernels is performed when multiple transform partition types are enabled for partitioning the data block into transform blocks and both primary and secondary transform kernels are enabled for the data block.

17. A method of processing visual media data, the method comprising:
obtaining a source video sequence;
performing a conversion between the source video sequence and a bitstream of visual media data, wherein the bitstream comprises:
- a plurality of encoded data blocks, including a current data block;
- a reference line indicator indicating whether at least one non-adjacent reference line is to be used for intra prediction of the current data block;
- a first indicator for a first set of transform kernels, wherein the first set of transform kernels has a first size; and
- a second indictor for a second set of transform kernels, wherein the second set of transform kernels has a second size that is less than the first size;
wherein a transform selected from the first set of transform kernels is used to decode the current data block when the reference line indicator indicates that at least one non-adjacent reference line is to be used for intra prediction of the current data block; and
wherein a transform selected from the second set of transform kernels is used to decode the current data block when the reference line indicator indicates that no non-adjacent reference line is to be used for intra prediction of the current data block.

18. The method of claim 17, wherein the second set of transform kernels is a subset of the first set of the transform kernels.

* * * * *